(12) United States Patent
Mochizuki et al.

(10) Patent No.: US 8,279,979 B2
(45) Date of Patent: Oct. 2, 2012

(54) SIGNAL PROCESSING APPARATUS, SIGNAL PROCESSING METHOD, AND PROGRAM

(75) Inventors: Shunsuke Mochizuki, Tokyo (JP); Takashi Nakanishi, Tokyo (JP); Ryosuke Araki, Tokyo (JP); Seiji Wada, Kanagawa (JP); Masahiro Yoshioka, Tokyo (JP); Hiroto Kimura, Tokyo (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1201 days.

(21) Appl. No.: 11/947,049

(22) Filed: Nov. 29, 2007

(65) Prior Publication Data

US 2008/0151121 A1 Jun. 26, 2008

(30) Foreign Application Priority Data

Dec. 26, 2006 (JP) ................................. 2006-350359

(51) Int. Cl.
*H04N 5/00* (2011.01)
*H04L 27/06* (2006.01)
*H04L 27/28* (2006.01)

(52) U.S. Cl. ........ 375/340; 375/260; 375/262; 375/343; 375/346; 375/348

(58) Field of Classification Search .................. 375/340, 375/152, 262, 254, 341, 343, 346, 354, 260; 455/575.1, 90.3, 128, 347
See application file for complete search history.

(56) References Cited

U.S. PATENT DOCUMENTS

| 6,816,541 B1 * | 11/2004 | Schmidl | 375/148 |
| 7,929,647 B2 * | 4/2011 | Johnson | 375/343 |
| 2004/0073321 A1 | 4/2004 | Kondo | |

FOREIGN PATENT DOCUMENTS

| JP | 11-239187 | 8/1999 |
| JP | 2003-179821 | 6/2003 |

OTHER PUBLICATIONS

U.S. Appl. No. 11/947,198, filed Nov. 29, 2007, Araki, et al.

(Continued)

*Primary Examiner* — David Ometz
*Assistant Examiner* — Ross Varndell
(74) *Attorney, Agent, or Firm* — Oblon, Spivak, McClelland, Maier & Neustadt, L.L.P.

(57) ABSTRACT

Disclosed herein is a signal processing apparatus that processes a signal transmitted over a transmission path that causes stationary distortion to occur in a waveform representing a signal value of a specific symbol in accordance with a value of a symbol transmitted before the specific symbol. The apparatus includes: storage means for storing distortion characteristics; acquisition means for acquiring the signal value of the specific symbol; correlation coefficient calculation means for calculating a correlation coefficient between the waveform representing the signal value of the specific symbol and each distortion characteristic; selection means for selecting a distortion characteristic(s) having a high correlation with the waveform representing the signal value of the specific symbol, based on the correlation coefficients; and determination means for determining the values of the symbols in the signal based on the combination of the values of the symbols corresponding to the selected distortion characteristic(s).

14 Claims, 11 Drawing Sheets

OTHER PUBLICATIONS

U.S. Appl. No. 11/947,423, filed Nov. 29, 2007, Nakanishi, et al.
U.S. Appl. No. 11/953,397, filed Dec. 10, 2007, Mochizuki, et al.
Steven M. Kay, "Fundamentals of Statistical Signal Processing : Detection Theory" Prentice Hall , XP002481847, ISBN: 0-13-504135-X, 1998, pp. 94-133.

Yi-Ling Chao, et al., "Optimal and Suboptimal Receivers for Ultra-wideband Transmitted Reference Systems", Globecom' 03, IEEE Global Telecommunications Conference., Conference Proceedings, vol. 2, XP010678167, ISBN: 978-0-7803-7974-9, Dec. 1, 2003, pp. 759-763.

* cited by examiner

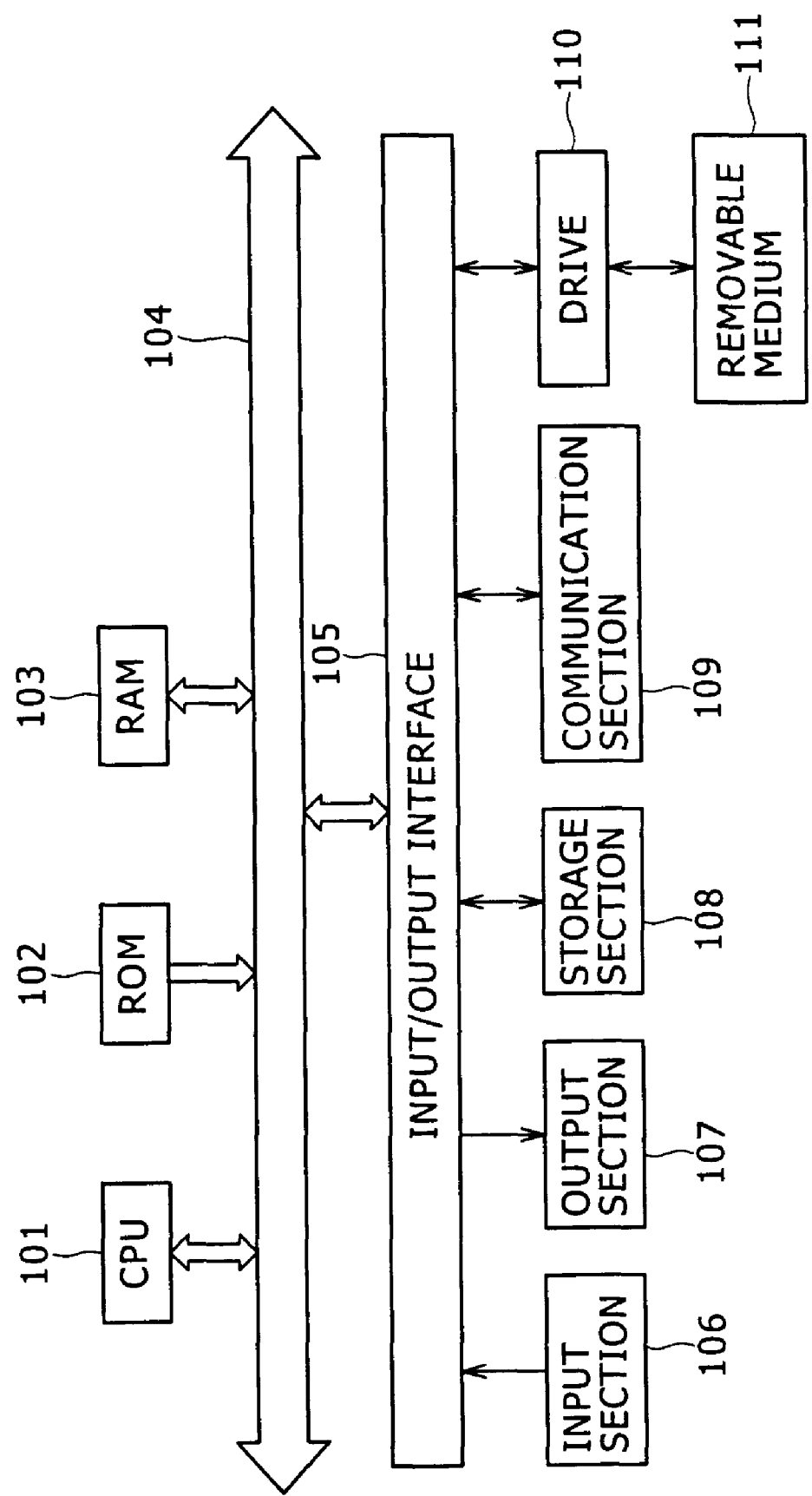

SIGNAL PROCESSING APPARATUS, SIGNAL PROCESSING METHOD, AND PROGRAM

CROSS REFERENCES TO RELATED APPLICATIONS

The present invention contains subject matter related to Japanese Patent Application JP 2006-350359 filed in the Japan Patent Office on Dec. 26, 2006, the entire contents of which being incorporated herein by reference.

BACKGROUND OF THE INVENTION

1. Field of the Invention

The present invention relates to a signal processing apparatus, a signal processing method, and a program. In particular, the present invention relates to a signal processing apparatus, a signal processing method, and a program which enables improvement in quality of communication performed over a transmission path in which signal distortion occurs.

2. Description of the Related Art

There are known signal processing apparatuses that receive an image signal from an external device such as a tuner for receiving a television broadcast signal or the like or a digital versatile disc (DVD) player, subject the received image signal to signal processing, and supply the resultant image signal to a display apparatus such as a cathode ray tube (CRT) or a liquid crystal display (LCD).

Such signal processing apparatuses perform signal processing such as a noise removal process of removing noise from the image signal supplied from the external device, an image conversion process of converting the image signal so that an image to be displayed on the display apparatus will have a higher image quality than an image supplied from the external device, or an image adjustment process of adjusting brightness or contrast of the image to be displayed on the display apparatus.

FIG. 1 is a block diagram illustrating an exemplary structure of a known signal processing apparatus 11.

In FIG. 1, the signal processing apparatus 11 includes a housing 12, connectors $13_1$ to $13_4$, an input selector 14, a signal router 15, connectors $16_1$ to $16_4$, connectors $17_1$ to $17_3$, functional blocks $18_1$ to $18_3$, a connector 19, a remote commander 20, an operation section 21, a system control block 22, and a control bus 23.

In the signal processing apparatus 11, the connectors $13_1$ to $13_4$ are connected to the input selector 14 via signal cables, and the input selector 14 is connected to the signal router 15 via a signal cable. Further, the signal router 15 is connected to the connectors $16_1$ to $16_4$ and the connector 19 via signal cables, and the signal router 15 is connected to the functional blocks $18_1$ to $18_3$ via the connectors $16_1$ to $16_3$ and the connectors $17_1$ to $17_3$. Still further, the input selector 14, the signal router 15, the connectors $16_1$ to $16_4$, and the system control block 22 are connected to one another via the control bus 23.

The housing 12 is a box in the shape of a rectangular parallelepiped, for example. The connectors $13_1$ to $13_4$, the connector 19, and the operation section 21 are provided on the exterior of the housing 12. The housing 12 contains the input selector 14, the signal router 15, the connectors $16_1$ to $16_4$, the connectors $17_1$ to $17_3$, the functional blocks $18_1$ to $18_3$, the system control block 22, and the control bus 23.

The connectors $13_1$ to $13_4$ are parts to which is connected a cable for connecting the signal processing apparatus 11 to an external device (not shown), such as a tuner or a DVD player, that supplies an image signal to the signal processing apparatus 11.

The image signals are supplied from the external devices to the input selector 14 via the connectors $13_1$ to $13_4$. Under control of the system control block 22, the input selector 14 supplies, to the signal router 15, the image signal supplied from the external device connected to one of the connectors $13_1$ to $13_4$.

Under control of the system control block 22, the signal router 15 supplies the signal supplied from the input selector 14 to the functional blocks $18_1$ to $18_3$ via the connectors $16_1$ to $16_3$ and the connectors $17_1$ to $17_3$. Signals obtained as a result of signal processing are supplied from the functional blocks $18_1$ to $18_3$ to the signal router 15, and the signal router 15 supplies the signals obtained as a result of signal processing to a display apparatus (not shown) connected to the connector 19 via the connector 19.

The connectors $16_1$ to $16_3$ and the connectors $17_1$ to $17_3$ can be connected to and detached from each other, and they are used to connect the signal router 15 or the control bus 23 to the functional blocks $18_1$ to $18_3$. To the connector $16_4$, a new functional block or the like to be added to the signal processing apparatus 11 can be connected.

Each of the functional blocks $18_1$ to $18_3$ has a signal processing circuit for performing signal processing such as the noise removal process, the image conversion process, or the image adjustment process. Each of the functional blocks $18_1$ to $18_3$ performs signal processing on the signal supplied from the signal router 15, and supplies the signal obtained as a result of signal processing to the signal router 15.

The connector 19 is a part to which is connected a cable for connecting the signal processing apparatus 11 to the display apparatus for displaying an image outputted from the signal processing apparatus 11.

The remote commander 20 has a plurality of buttons or the like to be operated by a user. When any of the buttons or the like is operated by the user, the remote commander 20 supplies an operation signal corresponding to that user operation to the system control block 22 using infrared rays or the like.

As with the remote commander 20, the operation section 21 has a plurality of buttons or the like to be operated by the user. When any of the buttons or the like is operated by the user, the operation section 21 supplies an operation signal corresponding to that user operation to the system control block 22.

When the operation signal corresponding to the user operation has been supplied from the remote commander 20 or the operation section 21, the system control block 22 controls, via the control bus 23, the input selector 14, the signal router 15, or the functional blocks $18_1$ to $18_3$ so that a process corresponding to the operation signal will be performed.

In the signal processing apparatus 11 having the above-described structure, the image signal is supplied to the signal router 15 via the connectors $13_1$ to $13_4$ and the input selector 14, and the image signal is transferred between the signal router 15 and the functional blocks $18_1$ to $18_3$ via the signal cables.

Recent years have seen an increase in resolution of images, and there is a tendency for the data amount of the image signal to be subjected to signal processing by the signal processing apparatus 11 to increase. The increase in the data amount of the image signal results in the image signal being transferred at a high speed between the signal router 15 and the functional blocks $18_1$ to $18_3$ via the signal cables, for example. When the signal is transferred at a high speed, a problem occurs in the transfer of the signal due to influence of frequency characteristics of the signal cables, cross talk, timing variations (i.e., skew) that occur between parallel signal cables, or the like.

Here, Japanese Patent Laid-Open No. 2003-179821 discloses a signal processing apparatus in which substrates contained in a housing of the apparatus transfer signals therebetween via wireless communication using electromagnetic waves for signal processing.

As in this signal processing apparatus, the signal router 15 and the functional blocks 18₁ to 18₃ may transfer signals therebetween via wireless communication using electromagnetic waves, for example. Thus, the problem that occurs when the signals are transferred via the signal cables can be avoided.

However, when the signal router 15 and the functional blocks 18₁ to 18₃ transfer the signals therebetween via wireless communication using the electromagnetic waves within the housing 12 of the signal processing apparatus 11, the electromagnetic waves will be reflected by walls of the housing 12 or diffracted by substrates contained in the housing 12, so that multiple transmission paths having different distances (i.e., multipath) will arise. When the signals are transferred over such multiple paths, the signals that have reached a receiver via the multiple paths will be out of phase with each other, resulting in signal interference.

As described above, when the signals are transferred via wireless communication within the housing 12, i.e., when the signals are communicated over transmission paths that cause waveforms of the signals to be distorted because of signal interference, a substrate at the receiving end is unable to demodulate the received signals successfully, resulting in reduction in communication quality.

The above problem occurs not only in the wireless communication within the housing but also in mobile communications via mobile phones, for example. That is, multipath that occurs as a result of the electromagnetic waves being reflected by a structure such as a building causes the signals to be out of phase with each other, resulting in signal interference and reduction in communication quality. Moreover, the above problem is not limited to the wireless communication. For example, when a signal is transferred via a cable, the signal is reflected at an end of the cable and the reflected signal will interfere with the original signal to be transferred, resulting in reduction in communication quality.

As countermeasures against multipath in signal processing using common wireless communication, there are some known methods such as a method of using orthogonal Frequency Division Multiplexing (OFDM) as a modulation scheme, a method of using spread spectrum and rake reception, a method of using multiple antennas, and a method of using a waveform equalizer.

In signal processing for image signals, particularly signals that need to be transferred at a high speed such as uncompressed image signals, it is necessary to reduce delays that occur in signal processing and make the delays uniform. With the use of the above countermeasures against multipath, however, it is difficult to reduce the delays that occur in signal processing or make the delays uniform.

Further, in the case where OFDM is adopted as the modulation scheme, a heavy load is imposed on a device that performs a fast Fourier transform (FFT) process for modulation and demodulation, and such a device may radiate increased amounts of heat, or costs may be increased. Still further, in the case where spread spectrum is used, more rapid signal processing than that for the signals to be transmitted is requisite to achieve high-speed communication, but so rapid signal processing is difficult to achieve, resulting in difficulty in achieving high-speed communication.

Still further, in the case where multiple antennas are used or where the waveform equalizer is used, it is necessary to insert a unique word (UW) in a packet, or a large-scale prediction circuit is requisite for improving the accuracy in predicting a change in transmission characteristics.

SUMMARY OF THE INVENTION

As described above, in wireless communication within a housing of any known signal processing apparatus, distortion occurs due to signal interference, resulting in reduction in communication quality.

In view of the above-described situation, the present invention has been devised to enable improvement in the quality of communication performed over a transmission path that causes signal distortion.

According to one embodiment of the present invention, there is provided a signal processing apparatus that processes a signal transmitted over a transmission path that causes stationary distortion to occur in a waveform representing a signal value of a specific symbol in accordance with a value of a symbol transmitted before the specific symbol, the apparatus including: storage means for storing distortion characteristics, each of which is a characteristic of a waveform that represents the signal value of the specific symbol and is distorted in accordance with the value of the specific symbol and a separate combination of values of a specific number of symbols transmitted before the specific symbol; acquisition means for acquiring the signal value of the specific symbol from the signal transmitted over the transmission path; correlation coefficient calculation means for calculating a correlation coefficient between the waveform representing the signal value of the specific symbol acquired by the acquisition means and each of the distortion characteristics stored in the storage means with respect to combination of the values of the symbols; selection means for selecting one or more distortion characteristics having a high correlation with the waveform representing the signal value of the specific symbol acquired by the acquisition means, based on the correlation coefficients calculated by the correlation coefficient calculation means; and determination means for determining the values of the symbols in the signal transmitted over the transmission path based on the combination of the values of the symbols corresponding to each of the one or more distortion characteristics selected by the selection means.

According to another embodiment of the present invention, there is provided a signal processing method for processing a signal transmitted over a transmission path that causes stationary distortion to occur in a waveform representing a signal value of a specific symbol in accordance with a value of a symbol transmitted before the specific symbol, the method including the steps of: acquiring the signal value of the specific symbol from the signal transmitted over the transmission path; calculating a correlation coefficient between the waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols; based on the correlation coefficients calculated with respect to each combination of the values of the symbols, selecting one or more distortion characteristics having a high correlation with the waveform representing the signal value of the specific symbol; and based on the combination of the values of the symbols corresponding to each of the one or more distortion characteristics having a high correlation with the waveform representing the signal value of the specific symbol, determining the values of the symbols in the signal transmitted over the transmission path.

According to yet another embodiment of the present invention, there is provided a program that causes a computer to perform signal processing of processing a signal transmitted over a transmission path that causes stationary distortion to occur in a waveform representing a signal value of a specific symbol in accordance with a value of a symbol transmitted before the specific symbol, the program causing the computer to perform the steps of: acquiring the signal value of the specific symbol from the signal transmitted over the transmission path; calculating a correlation coefficient between the waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols; based on the correlation coefficients calculated with respect to each combination of the values of the symbols, selecting one or more distortion characteristics having a high correlation with the waveform representing the signal value of the specific symbol; and based on the combination of the values of the symbols corresponding to each of the one or more distortion characteristics having a high correlation with the waveform representing the signal value of the specific symbol, determining the values of the symbols in the signal transmitted over the transmission path.

In one embodiment of the present invention, a signal value of a specific symbol is acquired from a signal transmitted over a transmission path, and a correlation coefficient is calculated between a waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols. Then, based on the correlation coefficients calculated with respect to each combination of the values of the symbols, one or more distortion characteristics having a high correlation with the waveform representing the signal value of the specific symbol are selected, and based on the combination of the values of the symbols corresponding to each of the one or more distortion characteristics having a high correlation with the waveform representing the signal value of the specific symbol, the values of the symbols in the signal transmitted over the transmission path are determined.

According to one embodiment of the present invention, it is possible to improve quality of communication performed over a transmission path in which signal distortion occurs.

BRIEF DESCRIPTION OF THE DRAWINGS

FIG. 11 is a block diagram illustrating an exemplary structure of a personal computer.

DETAILED DESCRIPTION OF THE PREFERRED EMBODIMENTS

Figure 1:
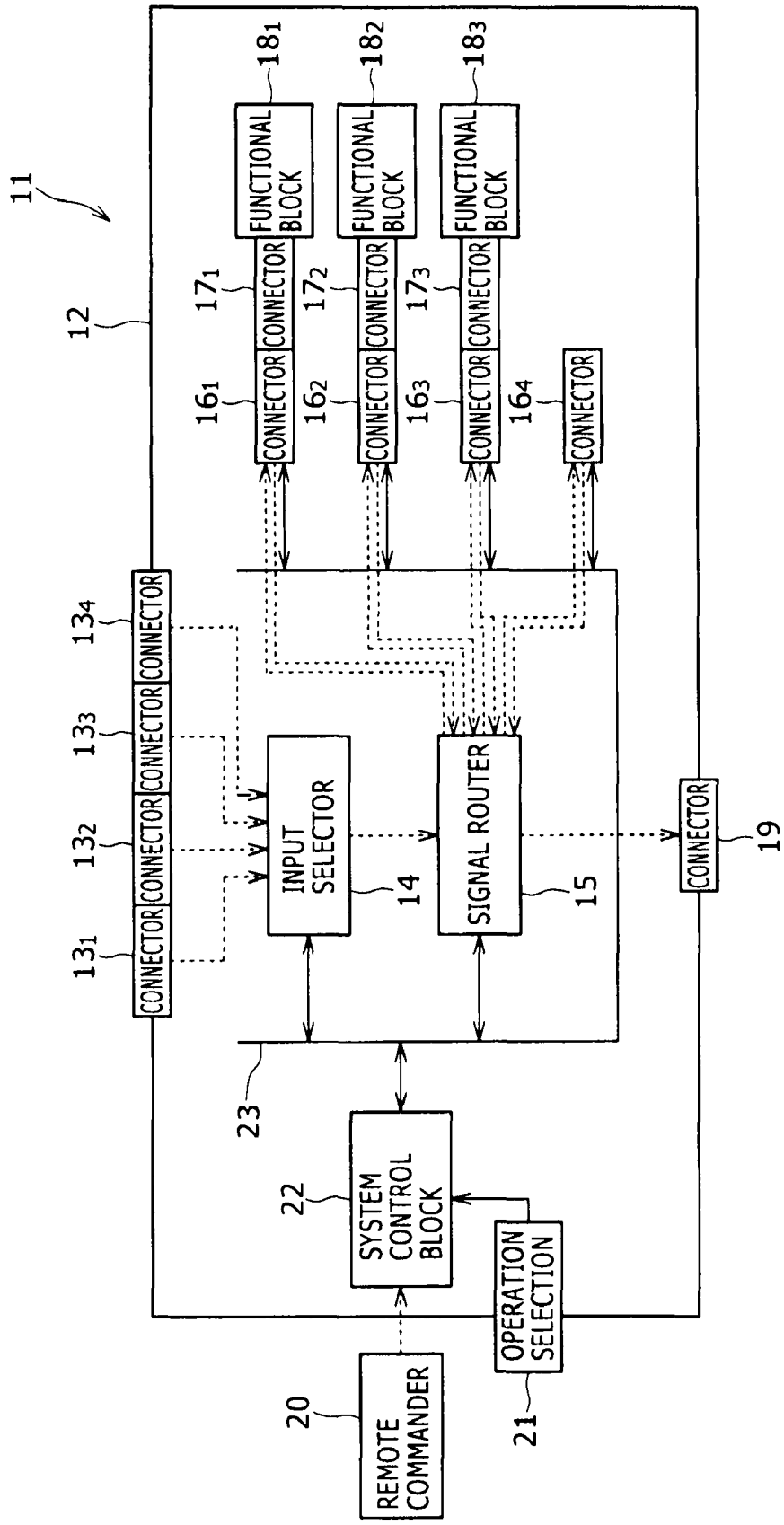
FIG. 1 is a block diagram illustrating an exemplary structure of a known signal processing apparatus.

Hereinafter, embodiments of the present invention will be described. Correspondence between the constituent features of the present invention and the embodiments that will be described in this specification taken in conjunction with the accompanying drawings is exemplified as follows. Note that this preliminary description is meant to confirm that an embodiment that supports the present invention is described in this specification and the accompanying drawings. Therefore, even if there is an embodiment that is described in this specification and the accompanying drawings but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

A signal processing apparatus according to one embodiment of the present invention is a signal processing apparatus that processes a signal transmitted over a transmission path that causes stationary distortion to occur in a waveform representing a signal value of a specific symbol in accordance with a value of a symbol transmitted before the specific symbol, the apparatus including: storage means (e.g., a delay profile storage section 75 in FIG. 6) for storing distortion characteristics, each of which is a characteristic of a waveform that represents the signal value of the specific symbol and is distorted in accordance with the value of the specific symbol and a separate combination of values of a specific number of symbols transmitted before the specific symbol; acquisition means (e.g., an A/D converter 82 in FIG. 9) for acquiring the signal value of the specific symbol from the signal transmitted over the transmission path; correlation coefficient calculation means (e.g., a correlation coefficient acquisition section 83 in FIG. 9) for calculating a correlation coefficient between the waveform representing the signal value of the specific symbol acquired by the acquisition means and each of the distortion characteristics stored in the storage means; selection means (e.g., a selection section 84 in FIG. 9) for selecting one or more distortion characteristics having a high correlation with the waveform representing the signal value of the specific symbol acquired by the acquisition means, based on the correlation coefficients calculated by the correlation coefficient calculation means; and determination means (e.g., a bit determination section 85 in FIG. 9) for determining the values of the symbols in the signal transmitted over the transmission path based on the combination of the values of the symbols corresponding to each of the one or more distortion characteristics selected by the selection means.

Figure 10:
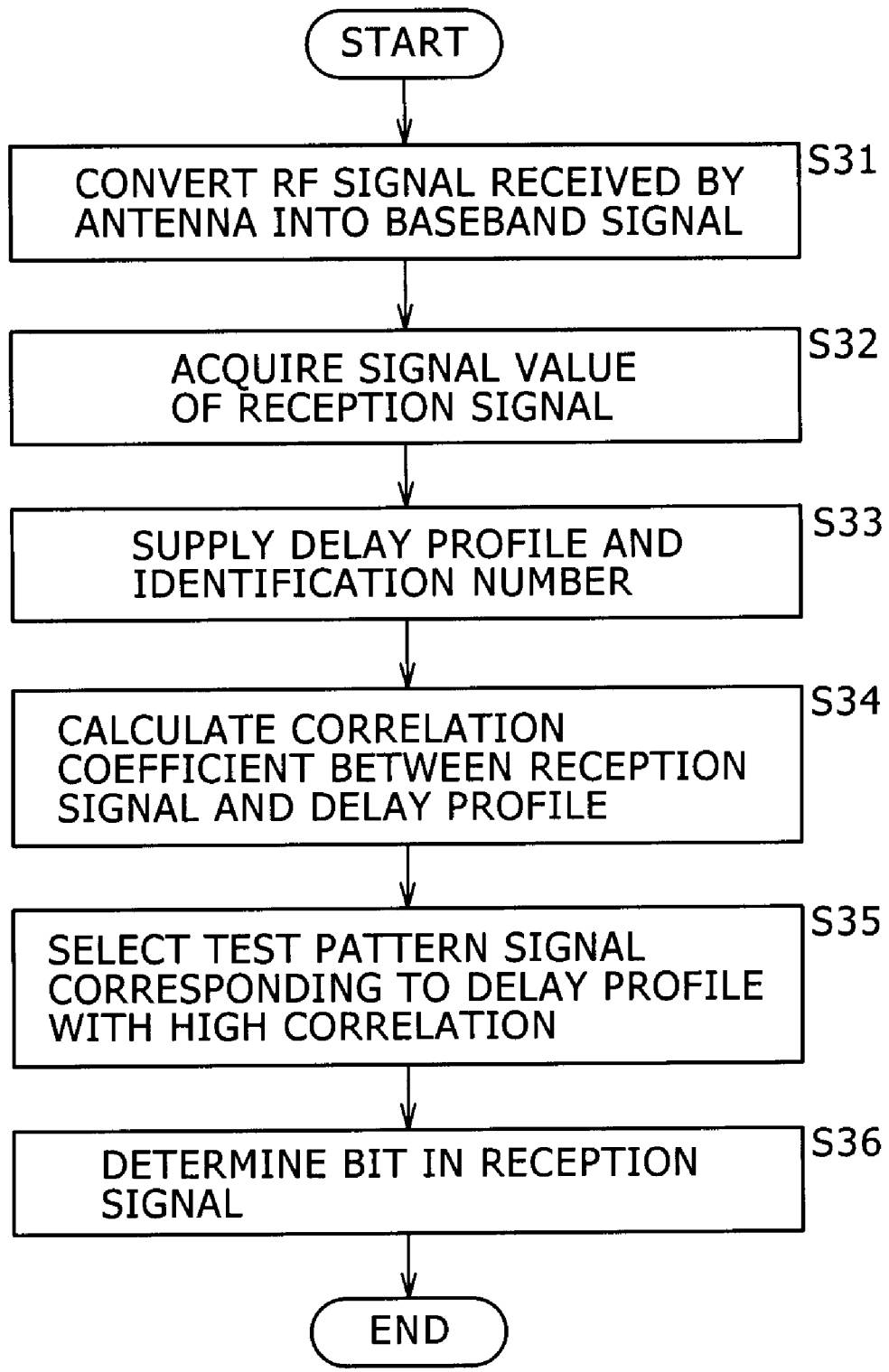
FIG. 10 is a flowchart illustrating a procedure in which the functional block determines the bits of the signal transmitted from the signal router.

A signal processing method according to one embodiment of the present invention is a signal processing method for processing a signal transmitted over a transmission path that causes stationary distortion to occur in a waveform representing a signal value of a specific symbol in accordance with a value of a symbol transmitted before the specific symbol, the method including the steps of: acquiring the signal value of the specific symbol from the signal transmitted over the transmission path (e.g., step S32 in FIG. 10); calculating a correlation coefficient between the waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols (e.g., step S34 in FIG. 10); based on the correlation coefficients calculated with respect to each combination of the values of the symbols, selecting one or more distortion characteristics having a high correlation with the waveform representing the signal value of the specific symbol (e.g., step S35 in FIG. 10); and based on the combination of the values of the symbols corresponding to each of the one or more distortion characteristics having a high correlation with the waveform representing the signal value of the specific symbol, determining the values of the symbols in the signal transmitted over the transmission path (e.g., step S36 in FIG. 10).

A program according to one embodiment of the present invention is a program that causes a computer to perform signal processing of processing a signal transmitted over a transmission path that causes stationary distortion to occur in a waveform representing a signal value of a specific symbol in accordance with a value of a symbol transmitted before the specific symbol, the program causing the computer to perform the steps of: acquiring the signal value of the specific symbol from the signal transmitted over the transmission path (e.g., step S32 in FIG. 10); calculating a correlation coefficient between the waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols (e.g., step S34 in FIG. 10); based on the correlation coefficients calculated with respect to each combination of the values of the symbols, selecting one or more distortion characteristics having a high correlation with the waveform representing the signal value of the specific symbol (e.g., step S35 in FIG. 10); and based on the combination of the values of the symbols corresponding to each of the one or more distortion characteristics having a high correlation with the waveform representing the signal value of the specific symbol, determining the values of the symbols in the signal transmitted over the transmission path (e.g., step S36 in FIG. 10).

Hereinafter, a specific embodiment of the present invention will be described in detail with reference to the accompanying drawings.

Figure 2:
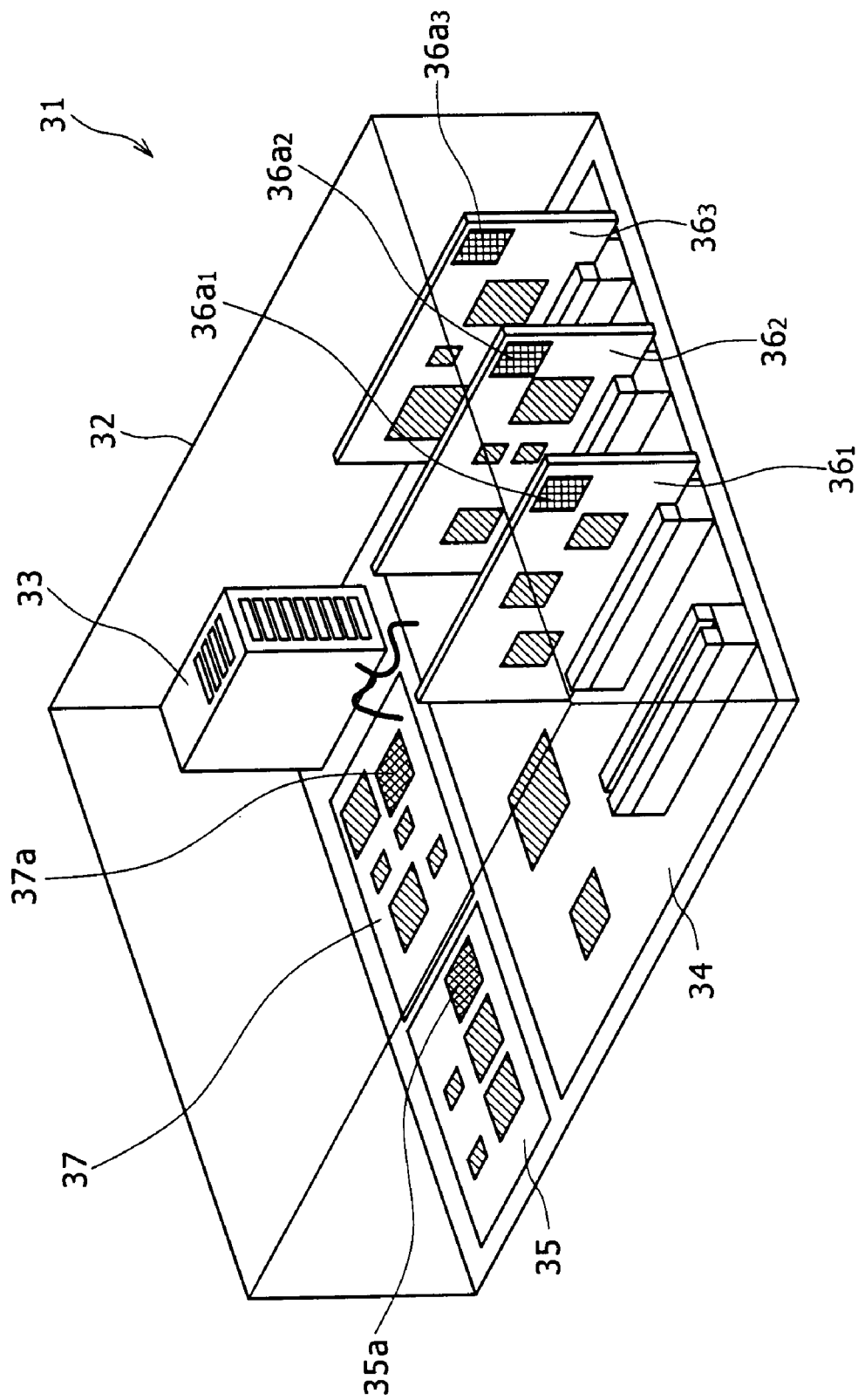
FIG. 2 is a perspective view of a signal processing apparatus according to one embodiment of the present invention, illustrating an exemplary structure of the signal processing apparatus.

FIG. 2 is a perspective view of a signal processing apparatus according to one embodiment of the present invention, illustrating an exemplary structure of the signal processing apparatus 31.

In FIG. 2, the signal processing apparatus 31 includes a housing 32, a power supply module 33, a platform substrate 34, an input substrate 35, signal processing substrates $36_1$ to $36_3$, and an output substrate 37.

The housing 32 is a box in the shape of a rectangular parallelepiped, and contains the power supply module 33, the platform substrate 34, the input substrate 35, the signal processing substrates $36_1$ to $36_3$, and the output substrate 37.

The power supply module 33 supplies power necessary for driving to the platform substrate 34, the input substrate 35, the signal processing substrates $36_1$ to $36_3$, and the output substrate 37.

The signal processing substrates $36_1$ to $36_3$ are mounted on the platform substrate 34, and power is supplied from the power supply module 33 to the signal processing substrates $36_1$ to $36_3$ via the platform substrate 34, for example.

The input substrate 35 is connected to a connector (e.g., connectors $43_1$ to $43_4$ in FIG. 3 described below) provided on the exterior of the housing 32. To the input substrate 35, an image signal is supplied from an external device (not shown) via this connector. In addition, the input substrate 35 has an antenna 35a for wireless communication using electromagnetic waves, and the input substrate 35 supplies the image signal supplied from the external device to the signal processing substrates $36_1$ to $36_3$ via the antenna 35a.

The signal processing substrates $36_1$ to $36_3$ have antennas $36a_1$ to $36a_3$ for wireless communication using electromagnetic waves, and the image signal is supplied from the input substrate 35 to the signal processing substrates $36_1$ to $36_3$ via the antennas $36a_1$ to $36a_3$. Each of the signal processing substrates $36_1$ to $36_3$ performs signal processing on the image signal supplied from the input substrate 35, such as a noise removal process, an image conversion process, or an image adjustment process, and supplies an image signal obtained as a result of the signal processing to the output substrate 37 via a corresponding one of the antennas $36a_1$ to $36a_3$.

The output substrate 37 has an antenna 37a for wireless communication using electromagnetic waves, and is connected to a connector (e.g., a connector 47 in FIG. 3 described below) provided on the exterior of the housing 32. The output substrate 37 supplies the image signal supplied from the signal processing substrates $36_1$ to $36_3$ to a display apparatus (not shown) connected to the connector provided on the exterior of the housing 32 via the antenna 37a.

Figure 3:
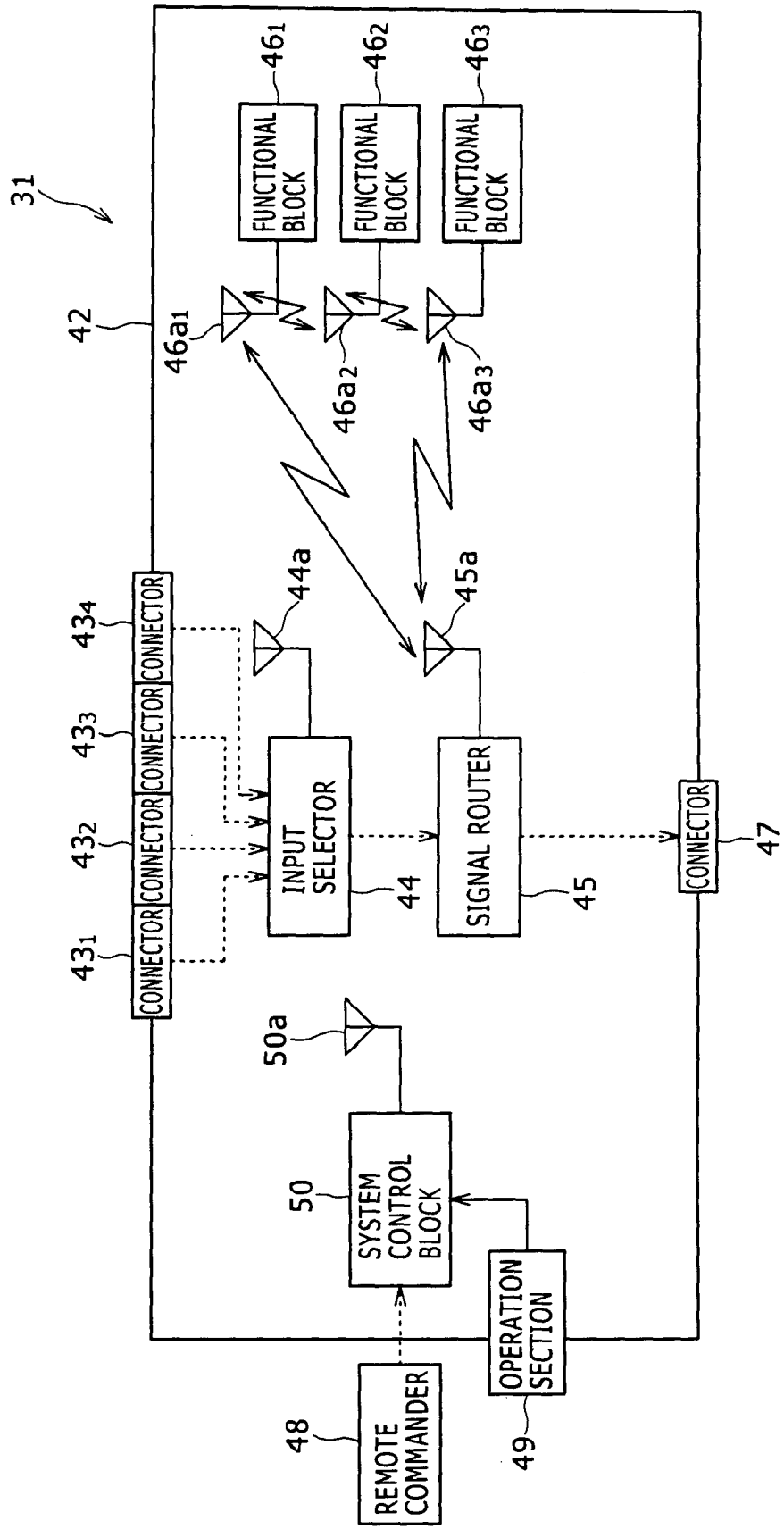
FIG. 3 is a block diagram illustrating an exemplary structure of a signal processing apparatus 31.

FIG. 3 is a block diagram illustrating an exemplary structure of the signal processing apparatus 31 as illustrated in FIG. 2.

In FIG. 3, the signal processing apparatus 31 includes a housing 42, the connectors $43_1$ to $43_4$, an input selector 44, a signal router 45, functional blocks $46_1$ to $46_3$, the connector 47, a remote commander 48, an operation section 49, and a system control block 50.

In the signal processing apparatus 31, the connectors $43_1$ to $43_4$ are connected to the input selector 44 via signal cables, the input selector 44 is connected to the signal router 45 via a signal cable, and the signal router 45 is connected to the connector 47 via a signal cable.

The housing 42 corresponds to the housing 32 in FIG. 2. The connectors $43_1$ to $43_4$, the connector 47, and the operation section 49 are provided on the exterior of the housing 42. The housing 42 contains the input selector 44, the signal router 45, the functional blocks $46_1$ to $46_3$, and the system control block 50.

The connectors $43_1$ to $43_4$ are parts to which are connected cables for connecting the signal processing apparatus 31 to external devices (not shown), such as a tuner or a DVD player, that supply image signals to the signal processing apparatus 31.

The input selector 44 is provided on the input substrate 35 as illustrated in FIG. 2, for example. The input selector 44 has an antenna 44a used for communication with the system control block 50. The image signals are supplied from the external devices to the input selector 44 via the connectors $43_1$ to $43_4$, and under control of the system control block 50, the input selector 44 supplies, to the signal router 45, the image signal supplied from the external device connected to one of the connectors $43_1$ to $43_4$.

The signal router 45 is provided on the output substrate 37 as illustrated in FIG. 2, for example. The signal router 45 has an antenna 45a used for communication with the system control block 50, the functional blocks $46_1$ to $46_3$, and the like. Under control of the system control block 50, the signal router 45 transmits the image signal supplied from the input selector 44 to the functional blocks $46_1$ to $46_3$ via the antenna 45a via wireless communication using electromagnetic waves.

In addition, the signal router 45 receives image signals transmitted from the functional blocks $46_1$ to $46_3$ via the antenna 45a via wireless communication using electromagnetic waves, and supplies the image signals received from the functional blocks $46_1$ to $46_3$ to a display apparatus (not shown) connected to the connector 47 via the connector 47.

The functional blocks $46_1$ to $46_3$ are provided on the signal processing substrates $36_1$ to $36_3$, respectively, as illustrated in FIG. 2, for example. The functional blocks $46_1$ to $46_3$ have antennas $46a_1$ to $46a_3$, respectively.

The functional blocks $46_1$ to $46_3$ receive the image signal transmitted from the signal router 45 via the antennas $46a_1$ to $46a_3$ via wireless communication using electromagnetic waves, and each of the functional blocks $46_1$ to $46_3$ performs signal processing, such as the noise removal process, the image conversion process, or the image adjustment process, on the received image signal. Then, the functional blocks $46_1$ to $46_3$ transmit an image signal obtained as a result of signal processing to the signal router 45 via the antennas $46a_1$ to $46a_3$ via wireless communication using electromagnetic waves. Further, the functional blocks $46_1$ to $46_3$ transmit and receive signals therebetween via their respective antennas $46a_1$ to $46a_3$.

Note that the functional blocks $46_1$ to $46_3$ will hereinafter be referred to as a "functional block 46" as appropriate, unless the functional blocks $46_1$ to $46_3$ need be differentiated from one another. Similarly, the antennas $46a_1$ to $46a_3$ provided in the functional blocks $46_1$ to $46_3$, respectively, will be referred to as an "antenna 46a" as appropriate.

Similar to the connector 19 as illustrated in FIG. 1, the connector 47 is a part to which is connected a cable for connecting the signal processing apparatus 31 to a display apparatus for displaying an image outputted from the signal processing apparatus 31.

Similar to the remote commander 20 and the operation section 21 as illustrated in FIG. 1, the remote commander 48 and the operation section 49 are operated by a user, and supply an operation signal corresponding to a user operation to the system control block 50.

The system control block 50 is provided on the platform substrate 34 as illustrated in FIG. 2, for example, and has an antenna 50a. When the operation signal corresponding to the user operation has been supplied from the remote commander 48 or the operation section 49, the system control block 50 controls the input selector 44, the signal router 45, or the functional block 46 via the antenna 50a via wireless communication using electromagnetic waves so that a process corresponding to the operation signal will be performed.

The signal processing apparatus 31 has the above-described structure, and within the housing 42 of the signal processing apparatus 31, the signal router 45 and the functional block 46 transmit and receive the image signal to or from each other via wireless communication using electromagnetic waves.

When wireless communication is performed within the housing 42, the electromagnetic waves outputted from the antenna 45a of the signal router 45, for example, are reflected by a wall of the housing 42 and the like and thus are transferred to the functional block 46 via multiple paths, so that the electromagnetic waves (i.e., signals) that have reached the functional block 46 via the multiple paths become out of phase with one another. As a result, the signals received by the functional block 46 interfere with one another, resulting in distortion of waveforms of the signals. This may lead to erroneous judgment about symbols in the signals, for example.

Next, referring to FIG. 4, distortion that occurs in the waveforms of the signals transmitted within the housing 42 via wireless communication will now be described below.

In wireless communication, multiple bits can be transmitted by one symbol represented by a signal in some modulation schemes. However, a case where only one bit (either 0 or 1) is transmitted by one symbol, as in binary phase shift keying (BPSK), will be described below. Also, while the signals are transmitted and received between the signal router 45 and the functional block 46, or between one functional block 46 and another, a case where the signals are transmitted from the signal router 45 to the functional block 46 will be described.

Figure 4:
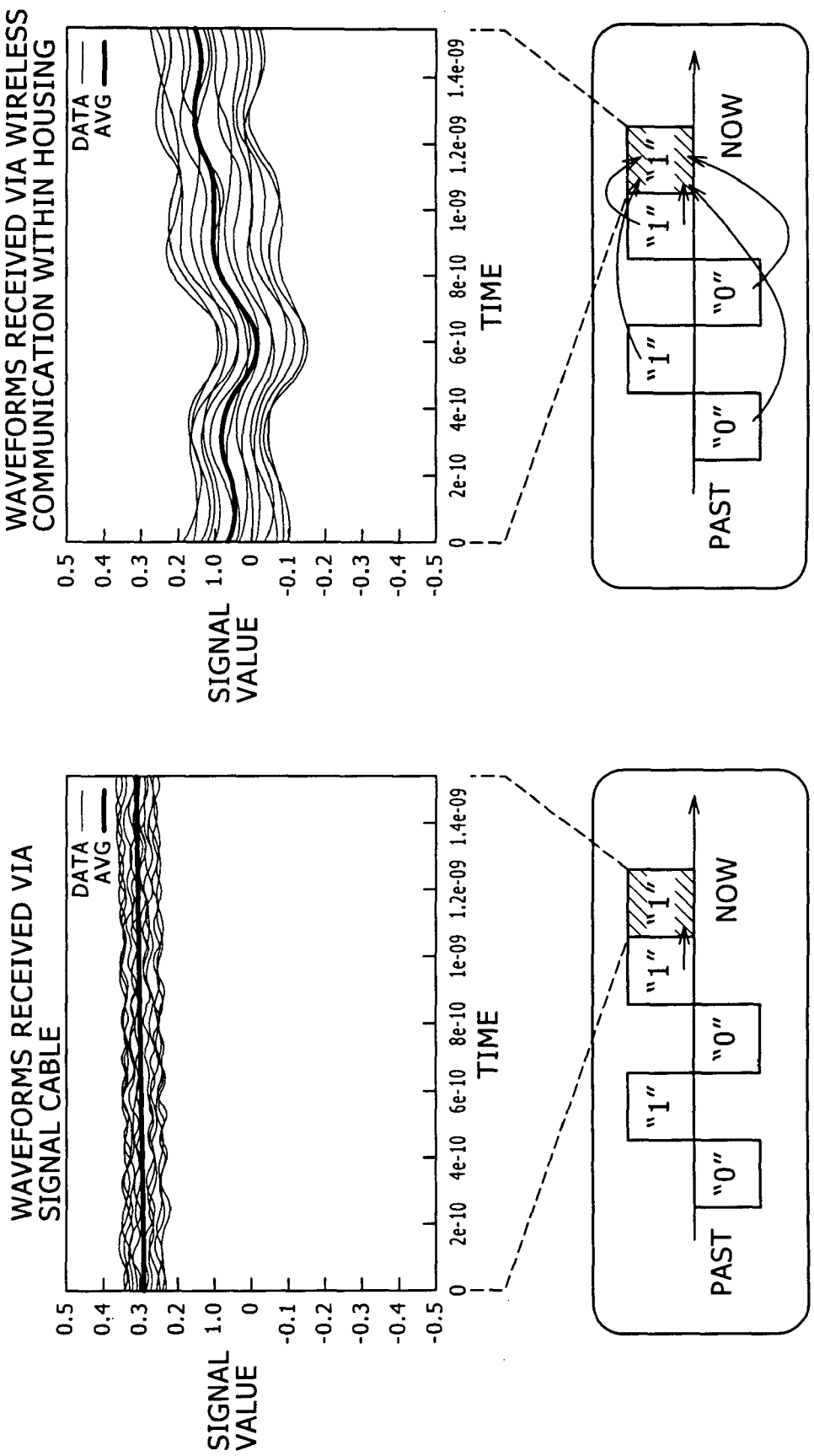
FIG. 4 shows diagrams for describing distortion that occurs in waveforms of a signal transmitted via wireless communication within a housing.

In the lower part of FIG. 4, a part of a signal transmitted from the signal router 45 to the functional block 46 is shown. Specifically, five bits, i.e., a specific bit (hereinafter referred to as a "current bit" as appropriate) and previous four bits, transmitted from the signal router 45 are shown in the lower part of FIG. 4. Assuming that these five bits are denoted as "a fourth previous bit, a third previous bit, a second previous bit, an immediately previous bit, and a current bit," a 5-bit signal "0,1,0,1,1" is shown.

Meanwhile, in the upper part of FIG. 4, the waveforms of the signals received by the functional block 46 are shown. In FIG. 4, a horizontal axis represents time, and a vertical axis represents the signal value of the signals. Further, in FIG. 4, thin lines represent waveforms (DATA) of a signal received by the functional block 46 a plurality of times, while a thick line represents an average waveform (AVG) of the waveforms of the plurality of signals.

In the upper right side of FIG. 4, waveforms of a signal corresponding to the current bit received by the functional block 46 via wireless communication are shown. In the upper left side of FIG. 4, assuming that the signal router 45 and the functional block 46 are connected to each other via a signal cable, for example, waveforms of the signal corresponding to the current bit received by the functional block 46 via the signal cable are shown.

Referring to the upper left side of FIG. 4, in the case where the signal is transmitted via the signal cable, the average of signal values of the current bit "1" is approximately 0.3, and a waveform of the average value assumes a significantly straight line.

In contrast, in the case where the signal is transmitted via wireless communication, in a closed system such as an inside of the housing 42, the divergence of the electromagnetic waves is slight, resulting in slight attenuation of the electromagnetic waves. Accordingly, several previous bits, e.g., the fourth previous bit, the third previous bit, the second previous bit, and the immediately previous bit, are reflected by walls of the housing 42 or reflected or diffracted by each substrate and eventually reach the functional block 46 after some delay. Thus, the several previous bits from the fourth previous bit to the immediately previous bit, which reach the functional block 46 after some delay, are superimposed upon the current bit, resulting in a change in the signal value of the current bit.

Thus, as illustrated in the upper right side of FIG. 4, distortion occurs in waveforms (hereinafter referred to as "waveforms of the current bit" as appropriate) representing the signal values of the signal corresponding to the current bit received by the functional block 46. Noticeably, although the current bit is 1, these waveforms include signal values below a threshold (i.e., 0) used for determining the value of the bit. This may lead to erroneous determination that the current bit is 0.

However, as illustrated in the upper right side of FIG. 4, the dispersal of the distorted waveforms falls within a certain range, and the distortion that occurs in the waveforms has stationary characteristics.

That is, because each of the power supply module 33, the platform substrate 34, the input substrate 35, the signal processing substrates $36_1$ to $36_3$, and the output substrate 37 is fixed within the housing 32 of the signal processing apparatus 31 as illustrated in FIG. 2, the electromagnetic waves are always reflected by the walls of the housing 32, the substrates within the housing 32, and so on in the same manners, and therefore, the interference between the electromagnetic waves, i.e., the influence of multipath, is stationary. As a result, the distortion that occurs in the waveforms of the current bit becomes stationary.

Specifically, in the case where the current and the previous four bits are "0,1,0,1,1" as illustrated in the lower part of FIG. 4, for example, the distortion that occurs in the waveforms of the current bit due to the wireless communication within the housing 42 is always such as illustrated in the upper right side of FIG. 4.

Therefore, if data (hereinafter referred to as a "delay profile" as appropriate) of characteristics of the waveforms of the current bit in which the stationary distortion has occurred due to the influence of a plurality of bits transmitted before the current bit reaching the functional block 46 via multiple paths after some delay has previously been stored in the functional block 46, for example, the functional block 46 is able to accurately determine the bit of the signal transmitted from the signal router 45 based on the delay profile and the waveforms of the current bit of the signal transmitted from the signal router 45.

In order to acquire such delay profiles, the signal router 45 and the functional block 46 transmit and receive signals (hereinafter referred to as "test pattern signals" as appropriate) each composed of a combination of bits having predetermined values a plurality of times before the transmission and reception of the image signal is performed in the signal processing apparatus 31 via wireless communication, for example.

Figure 5:
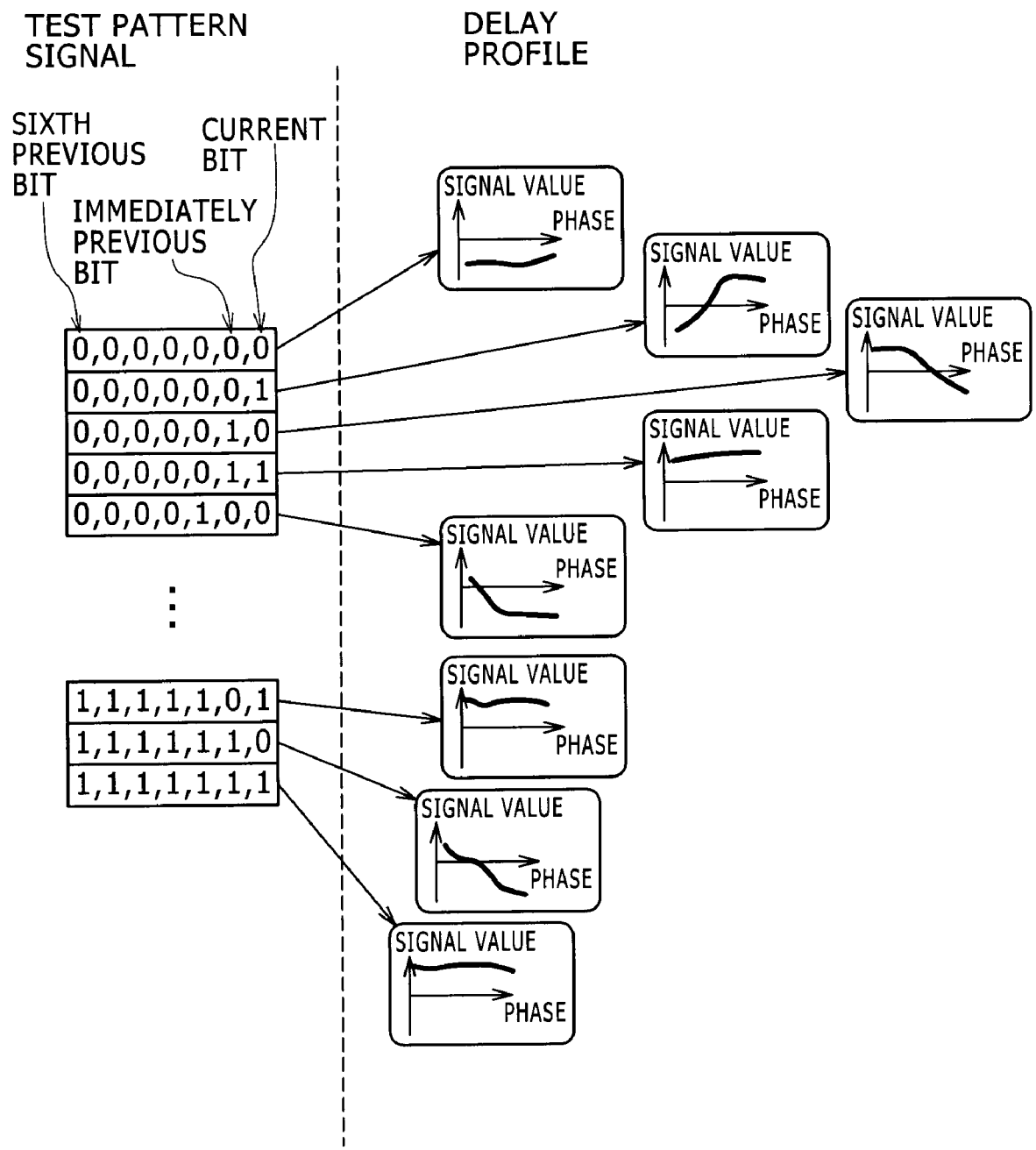
FIG. 5 shows examples of test pattern signals used for acquiring delay profiles and examples of the delay profiles.

FIG. 5 shows examples of the test pattern signals used for acquiring the delay profiles and examples of the delay profiles.

Test pattern signals each composed of seven bits are shown on the left-hand side of FIG. 5. In the case where previous six bits affect the signal value of the current bit, for example, seven-bit test pattern signals as shown in FIG. 5 are used.

In the case where the test pattern signals are each composed of seven bits, the test pattern signals have 128 (i.e., two to the power of seven) possible bit combinations when each bit is either 0 or 1. Accordingly, the 128 test pattern signals are transmitted and received between the signal router 45 and the functional block 46, so that delay profiles corresponding to each of the test pattern signals are acquired.

On the right-hand side of FIG. 5, the acquired delay profiles corresponding to the test pattern signals as shown on the left-hand side of FIG. 5 are shown. The signal router 45 and the functional block 46 acquire and store the delay profiles as shown in FIG. 5.

Figure 6:
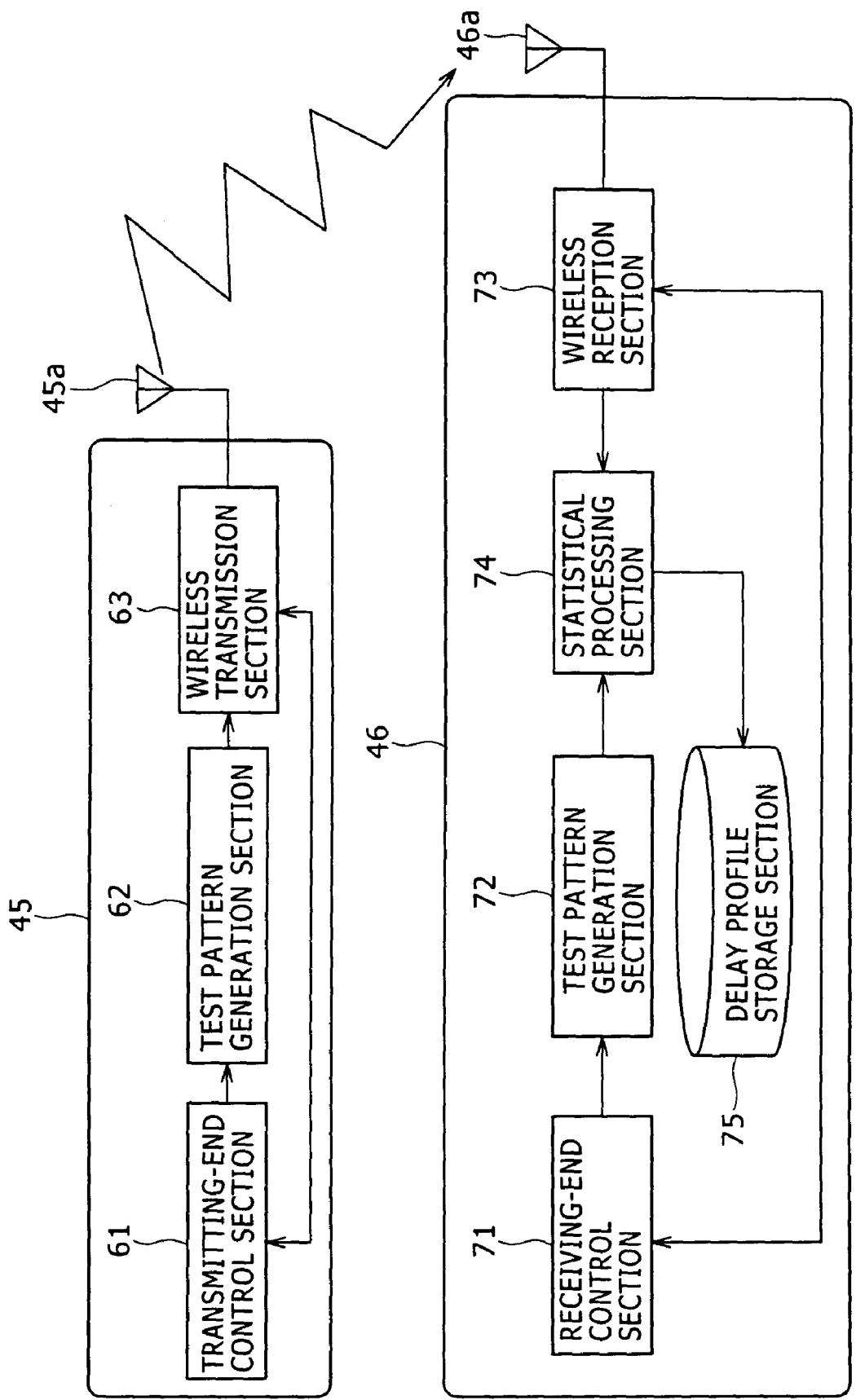
FIG. 6 is a block diagram illustrating exemplary structures of a signal router and a functional block.

FIG. 6 is a block diagram illustrating exemplary structures of the signal router 45 and the functional block 46 shown in FIG. 3. Blocks shown in FIG. 6 are those requisite for a process in which the signal router 45 transmits the test pattern signals to the functional block 46 and the functional block 46 acquires the delay profiles.

In FIG. 6, the signal router 45 includes the antenna 45a, a transmitting-end control section 61, a test pattern generation section 62, and a wireless transmission section 63, whereas the functional block 46 includes the antenna 46a, a receiving-end control section 71, a test pattern generation section 72, a wireless reception section 73, a statistical processing section 74, and a delay profile storage section 75.

The transmitting-end control section 61 controls the test pattern generation section 62 to generate the test pattern signals, and controls the wireless transmission section 63 to transmit the test pattern signals generated by the test pattern generation section 62 to the functional block 46. For example, in the case where the test pattern signals are each composed of seven bits, the transmitting-end control section 61 causes the test pattern generation section 62 to generate the 128 test pattern signals as shown in FIG. 5.

The possible bit combinations of the test pattern signals, an order in which the test pattern signals are transmitted, the number of times each of the test pattern signals is transmitted repeatedly are set previously in the transmitting-end control section 61.

Before starting the transmission of the test pattern signals, the transmitting-end control section 61 specifies the bit combinations of the test pattern signals to be transmitted to acquire the delay profiles, for example, and supplies a control signal (command) for giving an instruction to start a process of acquiring the delay profiles to the wireless transmission section 63, and causes the wireless transmission section 63 to transmit the control signal to the functional block 46.

Here, in the case of a signal, such as the image signal, that is transmitted and received at a high speed, a transmission time for one bit is short, and signal distortion caused by the influence of multipath is great, greatly affecting the determination of values of bits represented by the signal. In contrast, in the case of a signal, such as the control signal for giving the instruction to start the process, that is transmitted and received at a low speed, there is no need to shorten the transmission time for one bit, and the transmission time for one bit can be long. Therefore, in this case, signal distortion caused by the influence of multipath is not great, not greatly affecting the determination of the values of the bits represented by the signal. Therefore, when the transmitting-end control section 61 causes the control signal to be transmitted via wireless communication, the influence of distortion is not great, and the functional block 46 can receive the control signal successfully.

Note that the transmitting-end control section 61 and the receiving-end control section 71 may be connected to each other via a control bus (not shown), for example, and that the transmitting-end control section 61 may cause the control signal to be transmitted to the receiving-end control section 71 via the control bus.

Under control of the transmitting-end control section 61, the test pattern generation section 62 generates the test pattern signal and supplies the generated test pattern signal to the wireless transmission section 63.

The wireless transmission section 63 transmits the control signal supplied from the transmitting-end control section 61 or the test pattern signal supplied from the test pattern generation section 62 to the functional block 46 via the antenna 45a.

As is the case with the transmitting-end control section 61, the possible bit combinations of the test pattern signals, the order in which the test pattern signals are transmitted, the number of times each of the test pattern signals is transmitted repeatedly are previously set in the receiving-end control section 71. When the control signal for giving the instruction to start the process of acquiring the delay profiles has been supplied from the signal router 45 via the wireless reception section 73, the receiving-end control section 71 controls the test pattern generation section 72 to generate the test pattern signals as specified by the control signal in accordance with the above settings.

Under control of the receiving-end control section 71, the test pattern generation section 72 generates the test pattern signal, and supplies the generated test pattern signal to the statistical processing section 74.

The wireless reception section 73 receives the control signal or the test pattern signal transmitted from the signal router 45 via the antenna 46a. The wireless reception section 73 supplies the control signal transmitted from the signal router 45 to the receiving-end control section 71. In addition, the wireless reception section 73 extracts the signal value of the current bit from the test pattern signal transmitted from the signal router 45, and supplies the extracted signal value of the current bit to the statistical processing section 74.

The statistical processing section 74 receives, from the wireless reception section 73, the signal value of the current bit of the test pattern signal transmitted from the signal router 45. Based on the signal value of the current bit, the statistical processing section 74 acquires the delay profile.

Specifically, if the process of acquiring the delay profiles has been performed in the past and the delay profiles previously acquired are stored in the delay profile storage section 75, for example, the statistical processing section 74 reads, from the delay profile storage section 75, the delay profile corresponding to the test pattern signal supplied from the test pattern generation section 72. Then, the statistical processing section 74 performs a statistical process on the signal value of the current bit supplied from the wireless reception section 73 and the delay profile read from the delay profile storage section 75. For example, the statistical processing section 74 performs a process of calculating the average of the signal value of the current bit and the delay profile. The statistical processing section 74 acquires a value obtained as a result of the calculation as a new delay profile.

Meanwhile, if no corresponding delay profile previously acquired is stored in the delay profile storage section 75, the statistical processing section 74 acquires the signal value of the current bit supplied from the wireless reception section 73 as the delay profile.

Thus, the delay profile acquired by the statistical processing section 74 represents a characteristic (i.e., an average shape) of the distortion that occurs in the waveforms of the current bit of the test pattern signal because of the influence of some bits previous to the current bit reaching the functional block 46 via multiple paths after some delay when the test pattern signal is transmitted within the housing 42 via wireless communication.

Then, the statistical processing section 74 associates the delay profile acquired by the statistical processing section 74 with the test pattern signal supplied from the test pattern generation section 72, and supplies them to the delay profile storage section 75.

Note that the test pattern signals which the transmitting-end control section 61 causes the test pattern generation section 62 to generate and the test pattern signals which the receiving-end control section 71 causes the test pattern generation section 72 to generate are generated in accordance with the same settings. Therefore, a bit combination of the test pattern signal used by the statistical processing section 74 for acquiring the delay profile and a bit combination of the test pattern signal supplied from the test pattern generation section 72 to the statistical processing section 74 are identical.

The statistical processing section 74 performs the same process as described above with respect to all test pattern signals transmitted from the signal router 45, and thus acquires the delay profiles corresponding to all the test pattern signals.

The delay profile storage section 75 accumulates (stores) the delay profiles and the test pattern signals supplied from the statistical processing section 74 so as to be associated with each other.

Figure 7:
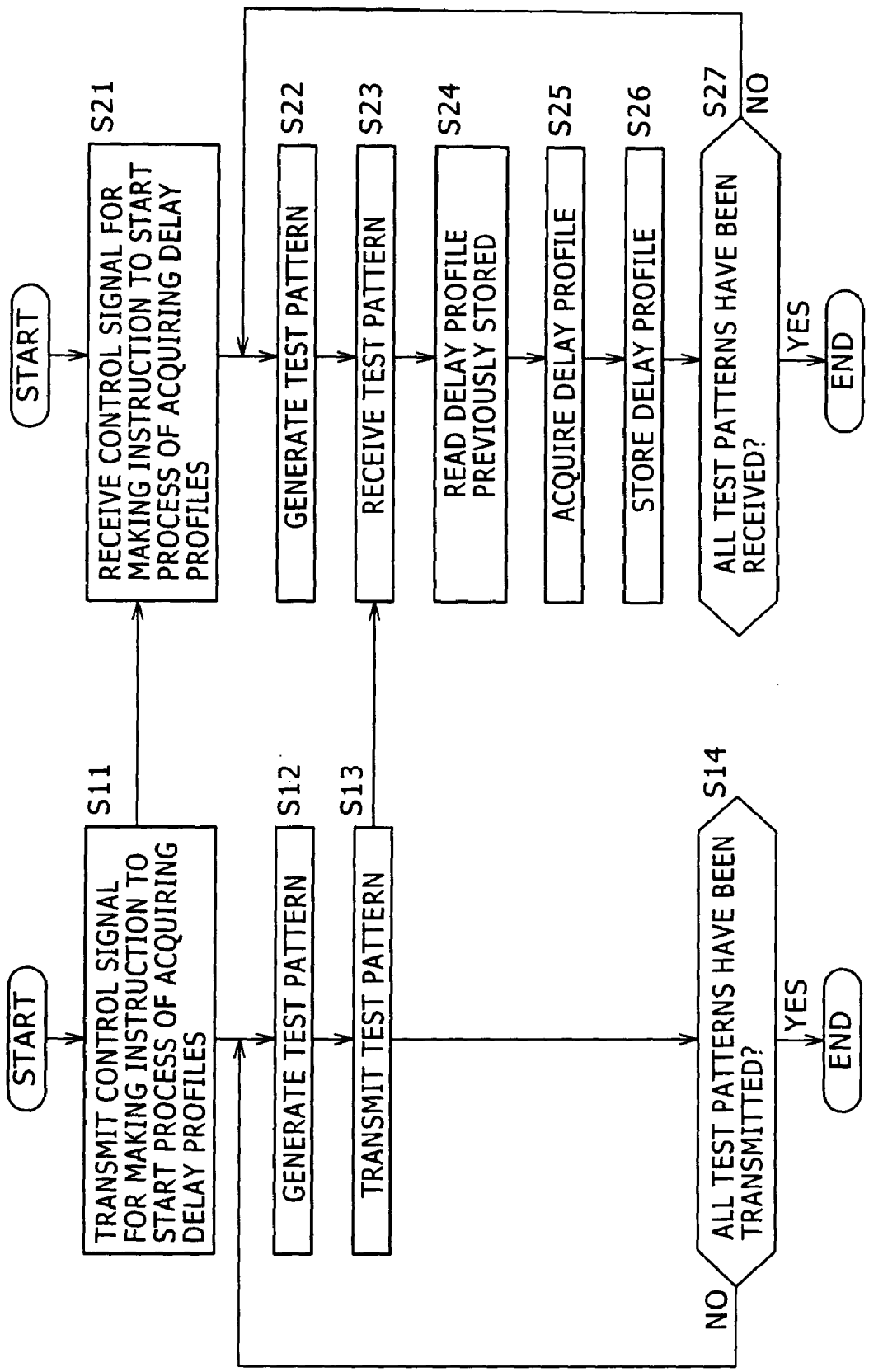
FIG. 7 is a flowchart illustrating a procedure in which the signal router transmits the test pattern signals and the functional block acquires the delay profiles.

FIG. 7 is a flowchart illustrating a procedure in which the signal router 45 illustrated in FIG. 6 transmits the test pattern signals and the functional block 46 acquires the delay profiles.

It is assumed here that the signal processing apparatus 31 as illustrated in FIG. 3 is configured to perform this procedure for acquiring the delay profiles at the time of initialization of the signal processing apparatus 31, for example.

After the user adds a substrate or the like to the signal processing apparatus 31 and operates the signal processing apparatus 31 to execute initialization, the signal processing apparatus 31 is restarted and the procedure is started. At step S11, the transmitting-end control section 61 of the signal router 45 supplies the control signal (command) for making the instruction to start the process of acquiring the delay profiles to the wireless transmission section 63, and the wireless transmission section 63 transmits the control signal to the functional block 46.

After the process of step S11, control proceeds to step S12, and the transmitting-end control section 61 controls the test pattern generation section 62 to generate, for example, a test pattern signal which the transmitting-end control section 61 is configured to transmit first. Under control of the transmitting-end control section 61, the test pattern generation section 62 generates the test pattern signal and supplies the generated test pattern signal to the wireless transmission section 63. Then, control proceeds to step S13.

At step S13, the wireless transmission section 63 transmits the test pattern signal supplied from the test pattern generation section 62 at step S12 to the functional block 46. Then, control proceeds to step S14.

At step S14, the transmitting-end control section 61 determines whether all test pattern signals to be transmitted to the functional block 46 have been transmitted via the wireless transmission section 63. Specifically, in the case where the test pattern signals are each composed of seven bits, for example, the transmitting-end control section 61 determines whether all the test pattern signals as shown on the left-hand side of FIG. 5 have been transmitted to the functional block 46.

If the transmitting-end control section 61 determines at step S14 that not all the test pattern signals to be transmitted to the functional block 46 have been transmitted by the wireless transmission section 63, control returns to step S12, and the transmitting-end control section 61 causes the test pattern generation section 62 to generate a test pattern signal that is to be transmitted next to the test pattern signal that was transmitted by the wireless transmission section 63 at the immediately previous iteration of step S13. Thereafter, processes as described above are repeated.

Meanwhile, if the transmitting-end control section 61 determines at step S14 that all the test pattern signals to be transmitted to the functional block 46 have been transmitted by the wireless transmission section 63, the procedure in the signal router 45 is finished.

On the other hand, the functional block 46 waits without starting its procedure until the control signal for making the instruction to start the process of acquiring the delay profiles is transmitted from the signal router 45, and if the signal router 45 transmits the control signal for making the instruction to start the process of acquiring the delay profiles at step S11, the wireless reception section 73 receives the control signal and supplies the received control signal to the receiving-end control section 71 at step S21.

After the process of step S21, control proceeds to step S22, and the receiving-end control section 71 controls the test pattern generation section 72 to generate, for example, the test pattern signal that has been set to be transmitted first from the signal router 45. Under control of the receiving-end control section 71, the test pattern generation section 72 generates the test pattern signal and supplies the generated test pattern signal to the statistical processing section 74. Then, control proceeds to step S23.

At step S23, the wireless reception section 73 waits for the test pattern signal to be transmitted from the signal router 45, and if the signal router 45 transmits the test pattern signal at step S13, the wireless reception section 73 receives the test pattern signal. Then, the wireless reception section 73 extracts, from the test pattern signal transmitted from the signal router 45, the signal value of the current bit and supplies it to the statistical processing section 74. Then, control proceeds to step S24.

At step S24, the statistical processing section 74 reads, from the delay profile storage section 75, the delay profile that has previously been acquired and stored in the delay profile storage section 75 and which is associated with the test pattern signal supplied from the test pattern generation section 72 at step S22.

After the process of step S24, control proceeds to step S25, and the statistical processing section 74 performs the statistical process on the signal value of the current bit supplied from the wireless reception section 73 at step S23 and the delay profile read from the delay profile storage section 75 at step S24. For example, the statistical processing section 74 calculates the average of the signal value of the current bit and the delay profile. The statistical processing section 74 acquires the value obtained as a result of the statistical process as a new delay profile. Then, control proceeds to step S26.

At step S26, the statistical processing section 74 stores the new delay profile acquired at step S25 in the delay profile storage section 75. Then, control proceeds to step S27.

At step S27, the receiving-end control section 71 determines whether all patterns of test pattern signals have been transmitted from the signal router 45.

If the receiving-end control section 71 determines at step S27 that not all patterns of test pattern signals have been transmitted from the signal router 45, control returns to step S22, and the receiving-end control section 71 causes the test pattern generation section 72 to generate the test pattern signal that has been set to be transmitted from the signal router 45 next to the test pattern signal that was received by the wireless reception section 73 at the immediately previous iteration of step S23. Thereafter, processes as described above are repeated.

Meanwhile, if the receiving-end control section 71 determines at step S27 that all patterns of test pattern signals have been transmitted from the signal router 45, this procedure is finished.

As described above, the signal router 45 transmits the test pattern signals, and the functional block 46 is able to acquire the delay profiles corresponding to the test pattern signals transmitted from the signal router 45. Since the delay profiles are acquired using stationarity of the wireless communication within the housing 42, the process of acquiring the delay profiles need be performed only at the time of initialization or the like, and thus high-quality and robust values thereof can be acquired.

Then, the functional block 46 uses the delay profiles acquired in the above-described manner to determine bits of a signal (hereinafter referred to as a "reception signal" as appropriate) transmitted from the signal router 45 and received by the functional block 46.

Specifically, the functional block 46 calculates a correlation coefficient between the signal value of each of the delay profiles and the signal value of the current bit of the reception signal, and determines the bit of the reception signal based on a test pattern signal used for acquiring a delay profile having a high correlation with the signal value of the current bit.

For example, the functional block 46 calculates the correlation coefficient A between the signal value of the delay profile and the signal value of the current bit of the reception signal using Equation 1 below.

[Equation 1]

$$A = \frac{\sum_{i=0}^{n} a_i b_i}{\sum_{i=0}^{n} \sqrt{a_i^2} \sum_{i=0}^{n} \sqrt{b_i^2}} \tag{1}$$

In Equation 1, $a_i$ is a signal value of the delay profile at an ith sampling point when the delay profile is sampled at a plurality of sampling points, $b_i$ is a signal value of the current bit of the reception signal at an ith sampling point when the current bit is sampled at a plurality of sampling points, and n is the number of samples taken from a signal corresponding to one bit, and corresponds to the number of sampling points for the signal value of the current bit of the reception signal or the delay profile.

Then, based on the correlation coefficient calculated using Equation 1, the functional block 46 selects the test pattern signal used for acquiring the delay profile having a high correlation with the signal value of the current bit, and determines the bit of the reception signal based on the test pattern signal selected based on the correlation coefficient.

Next, a method for the functional block 46 to select the test pattern signal based on the correlation coefficient and determine the bit of the reception signal based on the selected test pattern signal will be described below with respect to the cases where the current and previous three bits of the reception signal are "0,0,0,1" and "0,1,0,1," for example.

Figure 8:
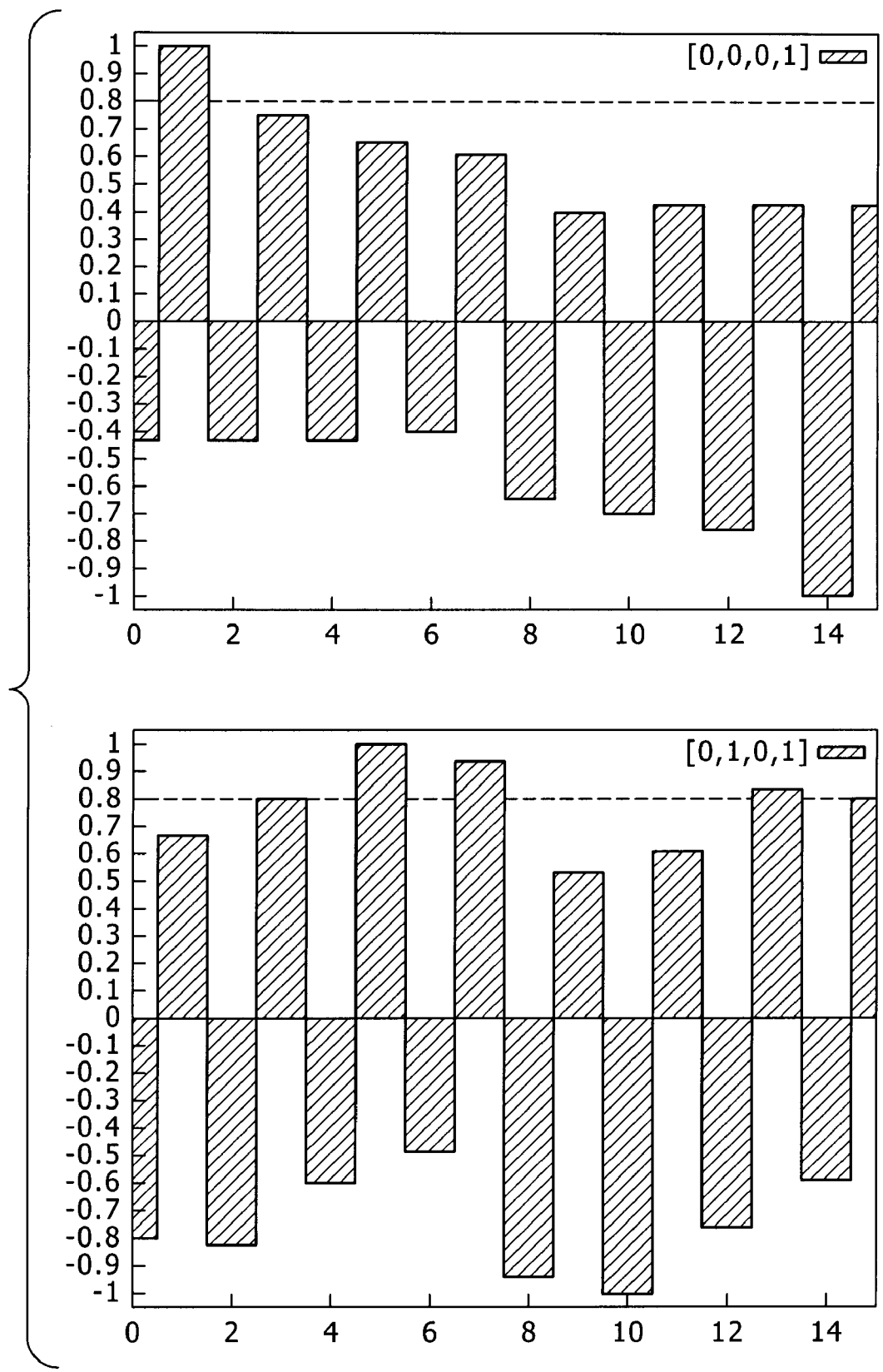
FIG. 8 shows relationships between correlation coefficients between a reception signal and the delay profiles and the test pattern signals used for acquiring the delay profiles.

FIG. 8 shows relationships between the correlation coefficients, which have been calculated from the signal value of the current bit of the reception signal and the signal values of the delay profiles, and the test pattern signals used for acquiring those delay profiles. An upper part of FIG. 8 shows the correlation coefficients in the case where a bit sequence of the reception signal is "0,0,0,1," whereas a lower part of FIG. 8 shows the correlation coefficients in the case where the bit sequence of the reception signal is "0,1,0,1."

In FIG. 8, vertical axes represent the correlation coefficients, whereas horizontal axes represent identification numbers for identifying the test pattern signals. Here, as an identification number for identifying each test pattern signal, a numerical value that is determined based on the bit combination of the test pattern signal can be used. For example, a decimal number obtained by converting each test pattern signal in binary notation into the decimal system may be used as the identification number of the test pattern signal.

For example, identification numbers for identifying four-bit test pattern signals are 0 to 15. Specifically, an identification number for identifying a test pattern signal "0,0,0,0" is 0, an identification number for identifying a test pattern signal "0,0,0,1" is 1, an identification number for identifying a test pattern signal "0,0,1,0" is 2, an identification number for identifying a test pattern signal "0,0,1,1" is 3, and so on, and finally, an identification number for identifying a test pattern signal "1,1,1,1" is 15.

It is assumed here that the functional block 46 selects a test pattern signal corresponding to a correlation coefficient equal to or greater than a predetermined threshold as the test pattern signal used for acquiring the delay profile having a high correlation with the reception signal. Suppose that the threshold is set at 0.8, for example. Then, in the case where the bit sequence of the reception signal is "0,0,0,1," as shown in the upper part of FIG. 8, only the test pattern signal identified by identification number 1 has a correlation coefficient equal to or greater than the threshold 0.8. Therefore, the functional block 46 selects the test pattern signal corresponding to identification number 1, i.e., the test pattern signal "0,0,0,1." In this case, the functional block 46 is able to uniquely determine that the bit sequence of the reception signal is "0,0,0,1."

Meanwhile, in the case where the bit sequence of the reception signal is "0,1,0,1," as shown in the lower part of FIG. 8, test pattern signals identified by identification numbers 5, 7, and 13 have a correlation coefficient equal to or greater than the threshold 0.8. Accordingly, the functional block 46 selects the test pattern signals corresponding to identification numbers 5, 7, and 13, i.e., test pattern signals "0,1,0,1," "0,1,1,1," and "1,1,0,1." In this case, the functional block 46 is not able to uniquely determine all bits of the reception signal, but is able to determine a part of the bit sequence of the reception signal.

Specifically, since the current bit in each of the test pattern signals "0,1,0,1," "0,1,1,1," and "1,1,0,1" is "1," the functional block 46 is able to determine that the current bit of the reception signal is "1." Similarly, since the second previous bit in each of the test pattern signals "0,1,0,1," "0,1,1,1," and "1,1,0,1" is "1," the functional block 46 is able to determine that the second previous bit of the reception signal is "1."

As described above, even when it is not possible to uniquely determine all bits of the reception signal, the functional block 46 is able to determine the value(s) of a part of the bit sequence of the reception signal, the part exerting a characteristic influence on the waveforms of the current bit.

Figure 9:
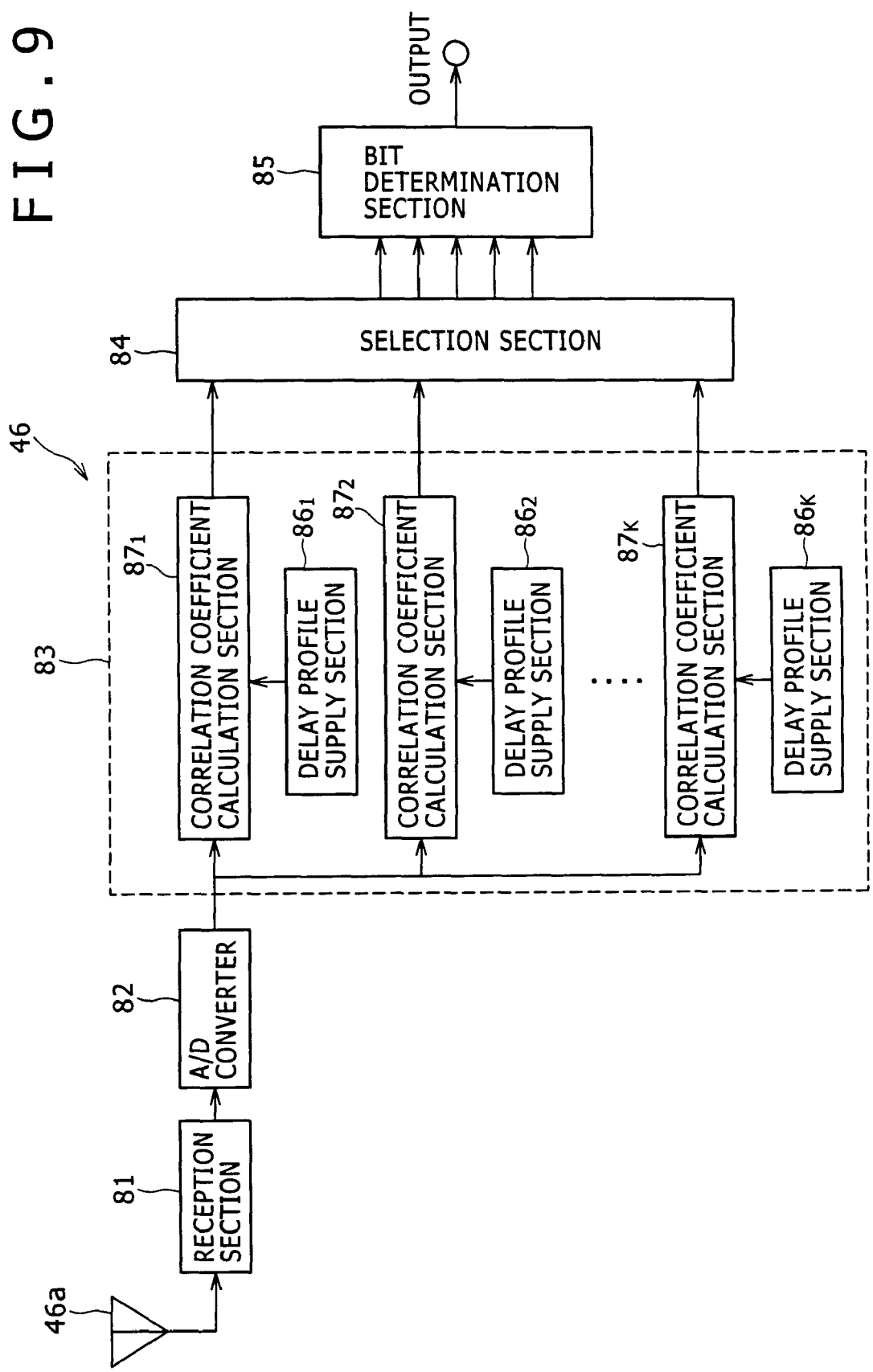
FIG. 9 is a block diagram illustrating an exemplary structure of the functional block that determines bits of the signal.

FIG. 9 is a block diagram illustrating an exemplary structure of the functional block 46 that determines the bits of the reception signal by the above-described method. FIG. 9 shows blocks necessary for a process in which the functional block 46 receives the signal transmitted from the signal router 45 (see FIG. 3) and determines the bits of the reception signal.

In FIG. 9, the functional block 46 includes the antenna 46*a*, a reception section 81, an A/D (Analog/Digital) converter 82, a correlation coefficient acquisition section 83, a selection section 84, and a bit determination section 85.

The reception section 81 has the antenna 46*a* connected thereto, and the antenna 46*a* receives an RF signal transmitted from the signal router 45 and supplies the received RF signal to the reception section 81. The reception section 81 combines the RF signal supplied from the antenna 46*a* with a signal having a predetermined frequency, thereby converting the RF signal into a baseband signal. Then, the reception section 81 supplies the baseband signal obtained from conversion of the RF signal received by the antenna 46*a*, i.e., the reception signal, to the A/D converter 82.

The A/D converter 82 subjects the reception signal supplied from the reception section 81 to A/D conversion. The A/D converter 82 acquires, as the signal value of the reception signal, a value obtained as a result of subjecting the reception signal supplied from the reception section 81 to A/D conversion, and supplies the acquired value to the correlation coefficient acquisition section 83.

Here, the A/D converter 82 subjects the reception signal to sampling (i.e., oversampling) at a frequency higher than a frequency of the bits, and acquires signal values (values obtained by quantizing the signal into multiple levels) of each bit at a plurality of sampling points, thereby acquiring the waveform of the reception signal.

The correlation coefficient acquisition section 83 has k delay profile supply sections 86$_1$ to 86$_k$ and k correlation coefficient calculation sections 87$_1$ to 87$_k$.

Here, the number, k, of delay profile supply sections 86$_1$ to 86$_k$ and the number, k, of correlation coefficient calculation sections 87$_1$ to 87$_k$ are equal to the number of delay profiles acquired by the process (see FIG. 7) of acquiring the delay profiles. In the case where the test pattern signals used for acquiring the delay profiles are each composed of four bits, for example, k is 16 (two raised to the power four). Note that the number of bits in the test pattern signal is determined based on how many previous bits affect the signal value of the current bit, and that prior simulation or the like is carried out to determine the number of bits in the test pattern signal, i.e., the influence of how many previous bits should be taken into account when determining the bits.

Each of the delay profile supply sections 86$_1$ to 86$_k$ reads the delay profile stored in the delay profile storage section 75 as illustrated in FIG. 6, and supplies the read delay profile to a corresponding one of the correlation coefficient calculation sections 87$_1$ to 87$_k$. In addition, each of the delay profile supply sections 86$_1$ to 86$_k$ supplies, to the corresponding one of the correlation coefficient calculation sections 87$_1$ to 87$_k$, the identification number of the test pattern signal corresponding to the delay profile supplied to the corresponding one of the correlation coefficient calculation sections 87$_1$ to 87$_k$.

The signal value of the reception signal is supplied from the A/D converter 82 to each of the correlation coefficient calculation sections $87_1$ to $87_k$. The signal value of the delay profile is supplied from the delay profile supply sections $86_1$ to $86_k$ to the correlation coefficient calculation sections $87_1$ to $87_k$, respectively. Each of the correlation coefficient calculation sections $87_1$ to $87_k$ calculates the correlation coefficient between the signal value of the reception signal and the signal value of the delay profile using Equation 1 mentioned above.

Each of the correlation coefficient calculation sections $87_1$ to $87_k$ associates the correlation coefficient calculated using Equation 1 with the identification number of the test pattern signal supplied from a corresponding one of the delay profile supply sections $86_1$ to $86_k$, and supplies them to the selection section 84.

Based on the correlation coefficients supplied from the correlation coefficient calculation sections $87_1$ to $87_k$, the selection section 84 selects the test pattern signal used for acquiring the delay profile having a high correlation with the signal value of the reception signal as described above with reference to FIG. 8, and supplies the identification number of the selected test pattern signal to the bit determination section 85.

Based on values of bits in the test pattern signal identified by the identification number supplied from the selection section 84, the bit determination section 85 determines the bit of the reception signal, and outputs the determined bit of the reception signal.

For example, in the case where the selection section 84 has selected only one test pattern signal, the bit determination section 85 determines the same values as the values of the bits in the selected test pattern signal to be the values of the bits in the reception signal.

In the case where the selection section 84 has selected a plurality of test pattern signals, if the value of the current bit in each of the plurality of test pattern signals is "1," the bit determination section 85 determines that the value of the current bit in the reception signal is "1," whereas if the value of the current bit in each of the plurality of test pattern signals is "0," the bit determination section 85 determines that the value of the current bit in the reception signal is "0." Further, if the value of an nth previous bit in each of the plurality of test pattern signals is "1," the bit determination section 85 determines that the value of an nth previous bit in the reception signal is "1," whereas if the value of the nth previous bit in each of the plurality of test pattern signals is "0," the bit determination section 85 determines that the value of the nth previous bit in the reception signal is "0."

FIG. 10 is a flowchart illustrating a procedure in which the functional block 46 as shown in FIG. 9 determines the bit in the reception signal.

If the antenna 46a receives the RF signal transmitted from the signal router 45 and supplies the received RF signal to the reception section 81, the reception section 81, at step S31, converts the RF signal received by the antenna 46a into the baseband signal and supplies the reception signal to the A/D converter 82.

After the process of step S31, control proceeds to step S32, and the A/D converter 82 subjects the reception signal supplied from the reception section 81 to A/D conversion, and acquires the signal value of the reception signal. The A/D converter 82 supplies the signal value of the reception signal to each of the correlation coefficient calculation sections $87_1$ to $87_k$ in the correlation coefficient acquisition section 83, and control proceeds to step S33.

At step S33, each of the delay profile supply sections $86_1$ to $86_k$ reads the delay profile stored in the delay profile storage section 75 as shown in FIG. 6, and supplies the signal value of the delay profile to the corresponding one of the correlation coefficient calculation sections $87_1$ to $87_k$. In addition, each of the delay profile supply sections $86_1$ to $86_k$ supplies the identification number for identifying the test pattern signal associated with the delay profile to the corresponding one of the correlation coefficient calculation sections $87_1$ to $87_k$.

After the process of step S33, control proceeds to step S34, and each of the correlation coefficient calculation sections $87_1$ to $87_k$ calculates the correlation coefficient between the signal value of the reception signal supplied from the A/D converter 82 at step S32 and the signal value of the delay profile supplied from the corresponding one of the delay profile supply sections $86_1$ to $86_k$ at step S33. Each of the correlation coefficient calculation sections $87_1$ to $87_k$ associates the calculated correlation coefficient with the identification number of the test pattern signal supplied from the corresponding one of the delay profile supply sections $86_1$ to $86_k$ at step S33, and supplies them to the selection section 84.

After the process of step S34, control proceeds to step S35, and the selection section 84, based on the correlation coefficients supplied from the correlation coefficient calculation sections $87_1$ to $87_k$, selects the test pattern signal identified by the identification number associated with a correlation coefficient equal to or greater than the predetermined threshold as the test pattern signal used for acquiring the delay profile having a high correlation with the signal value of the reception signal, and supplies the identification number of the selected test pattern signal to the bit determination section 85. Then, control proceeds to step S36.

At step S36, based on the values of the bits in the test pattern signal identified by the identification number supplied from the selection section 84, the bit determination section 85 determines the value of the bit in the reception signal. Then, this procedure is finished.

As described above, based on the signal value of the current bit of the reception signal, the functional block 46 is able to determine the values of a plurality of bits transmitted before the current bit as well as the value of the current bit.

As described above, using the distortion that occurs in the waveforms of the current bit in accordance with the values of a plurality of bits that reach the functional block 46 after some delay due to the influence of multipath, the functional block 46 determines the values of the plurality of bits, whereby it becomes possible to determine the values of the bits more accurately than when determining the value of only the current bit based on the signal value of the current bit, resulting in improved quality of communication.

In known wireless communication, for example, a device at the transmitting end separates a signal into blocks and adds an error correcting code to each of the blocks before transmitting them, and a device at the receiving end receives and expands the blocks and then needs to perform a process of correcting an error that has occurred in the signal using the error correcting code. In contrast, because, in the signal processing apparatus 31, the bits can be determined accurately using the delay profiles, the signal router 45 only needs to transmit the bits of the signal sequentially, and the functional block 46 only needs to receive the signal from the signal router 45 and determine the bits of the signal sequentially. Accordingly, it is possible to reduce the delays and make the delays more uniform compared to in known wireless communication. That is, it is possible to easily achieve more real-time communication. Moreover, since it is not necessary to perform the process of correcting the error, the apparatus can have a simpler structure.

Further, in known wireless communication, it is necessary, for example, to insert a UW in a packet as a countermeasure against multipath. In contrast, in the above-described embodiment, the quality of communication can be improved based on the delay profiles, and therefore the insertion of the UW is not necessary, resulting in reduced overhead for the packet and improved speed of communication.

Further, in the signal processing apparatus 31, as in a known signal processing apparatus in which the signal is transmitted via a signal cable, the bits of the signal are transmitted sequentially. Therefore, as a substitute for a harness between substrates or substrate connectors, the system of the wireless communication performed in the signal processing apparatus 31 can be introduced, easily and at a low cost, into the known signal processing apparatus in which the signal is transmitted via the signal cable. Still further, in a process of manufacturing the signal processing apparatus 31, a process for harness connection and the like, which are necessary with the known signal processing apparatus, can be omitted.

Note that the case where the signal is transmitted from the signal router 45 to the functional block 46 has been described in the above-described embodiment. However, also in cases where the signal is transmitted from the functional block 46 to the signal router 45, where the signal is transmitted and received between different functional blocks 46, and the like, the current bit can be determined accurately by the same procedure as in the case where the signal is transmitted from the signal router 45 to the functional block 46.

Still further, the number of test pattern signals selected by the selection section 84 may be previously set in the selection section 84, for example. In this case, the selection section 84 may select the set number of test pattern signals in descending order of correlation coefficient, thereby selecting the test pattern signals used for acquiring delay profiles having a high correlation with the signal value of the reception signal.

As described above, when the value of a certain bit (the current bit or the nth previous bit) is identical in each of the selected test pattern signals, the bit determination section 85 may determine that value to be the value of a corresponding bit in the reception signal. Alternatively, the value of each bit in the reception signal may be determined based on majority rule, for example.

The above-described series of processes may be implemented in either hardware or software. In the case where the series of processes is implemented in software, a program that forms the software is installed from a program storage medium into a computer having a dedicated hardware configuration or a general-purpose personal computer or the like that becomes capable of performing various functions when various programs are installed therein.

FIG. 11 is a block diagram illustrating an exemplary structure of a personal computer that performs the above-described series of processes in accordance with the program. A central processing unit (CPU) 101 performs various processes in accordance with the program stored in a read only memory (ROM) 102 or a storage section 108. The program executed by the CPU 101, data, and the like are stored in a random access memory (RAM) 103 as appropriate. The CPU 101, the ROM 102, and the RAM 103 are connected to one another via a bus 104.

An input/output interface 105 is also connected to the CPU 101 via the bus 104. An input section 106 formed by a keyboard, a mouse, a microphone, or the like and an output section 107 formed by a display, a loudspeaker, or the like are connected to the input/output interface 105. The CPU 101 performs various processes in accordance with instructions inputted via the input section 106. Then, the CPU 101 outputs results of such processes to the output section 107.

The storage section 108 connected to the input/output interface 105 is formed by a hard disk, for example, and stores the program executed by the CPU 101 and various types of data. A communication section 109 communicates with an external device via a network such as the Internet or a local area network.

The program may be acquired via the communication section 109 and stored in the storage section 108.

A drive 110 connected to the input/output interface 105 drives a removable medium 111, such as a magnetic disk, an optical disk, a magneto-optical disk, or a semiconductor memory, when the removable medium 111 is mounted thereon, and acquires a program, data, or the like recorded on the removable medium 111. The acquired program or data is transferred to and stored in the storage section 108 as necessary.

Referring to FIG. 11, the program storage medium that has stored therein the program to be installed into and made executable by the computer is formed, for example, by: the removable medium 111, which is a packaged medium formed by the magnetic disk (including a flexible disk), the optical disk (including a CD-ROM (Compact Disc-Read Only Memory), and a DVD (Digital Versatile Disc)), the magneto-optical disk, the semiconductor memory, or the like; the ROM 102 in which the program is temporarily or permanently stored; or the hard disk that forms the storage section 108. The storage of the program into the program storage medium is achieved using a wired or wireless communication medium, such as a local area network, the Internet, or digital satellite broadcasting, via the communication section 109, which is an interface such as a router or a modem, as necessary.

Note that the present invention is applicable to a device that uses a modulation scheme in which a plurality of bits are transmitted by one symbol, such as quadrature phase shift keying (QPSK) or quadrature phase shift keying (8PSK) as well as to a device that uses a modulation scheme in which one bit is transmitted by one symbol.

Also note that the present invention is applicable to outdoor wireless communication in an environment in which the delay profiles are steady as well as to wireless communication within a housing of a device. Also note that the present invention is also applicable to a device in which when a signal is transmitted via a cable, the signal is reflected at an end of the cable and signal distortion occurs due to a combination of the signal to be transferred and the reflected signal. Application of the present invention to such a device results in improved quality of communication.

Further, in near field communication using a magnetic field, for example, a communication distance is limited and thus restrictions are imposed on an arrangement of antennas used for communication. In the signal processing apparatus 31, however, restrictions are not imposed on the arrangement of the antennas, and communication is achieved with high quality.

Also note that the steps described above with reference to the above-described flowcharts need not be performed chronologically in an order as indicated by the flowcharts. Some steps may be performed in parallel or independently. For example, some steps may be performed by parallel processing or by an object.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus that processes a signal transmitted over a transmission path that causes stationary distortion to occur in a waveform representing a signal value of a specific symbol in accordance with a value of a symbol transmitted before the specific symbol, the apparatus comprising:

storage means for storing distortion characteristics, each of which is a characteristic of a waveform that represents the signal value of the specific symbol and is distorted in accordance with the value of the specific symbol and a separate combination of values of a specific number of symbols transmitted before the specific symbol, the storage means storing a number of different distortion characteristics (d) is equal to the following equation:

$$d = x^{(y+1)}$$

where, x is a number of different possible symbols;
and y is the specific number of symbols transmitted before the specific symbol;

acquisition means for acquiring the signal value of the specific symbol from the signal transmitted over the transmission path;

correlation coefficient calculation means for calculating a correlation coefficient between the waveform representing the signal value of the specific symbol acquired by said acquisition means and each of the distortion characteristics stored in said storage means with respect to combination of the values of the symbols;

selection means for selecting one or more distortion characteristics having a high correlation with the waveform representing the signal value of the specific symbol acquired by said acquisition means, based on the correlation coefficients calculated by said correlation coefficient calculation means; and determination means for determining the values of the symbols in the signal transmitted over the transmission path based on the combination of the values of the symbols corresponding to each of the one or more distortion characteristics selected by said selection means.

2. The signal processing apparatus according to claim 1, wherein said selection means selects, as the one or more distortion characteristics having a high correlation with the waveform representing the signal value of the specific symbol, a distortion characteristic for which the correlation coefficient calculated by said correlation coefficient calculation means is equal to or greater than a predetermined threshold.

3. The signal processing apparatus according to claim 1, wherein, when a plurality of distortion characteristics have been selected by said selection means, and the value of the specific symbol is identical in each of the combinations of the values of the symbols corresponding to the plurality of distortion characteristics, said determination means determines the value of the specific symbol in each of the combinations of the values of the symbols to be the value of the specific symbol in the signal transmitted over the transmission path.

4. The signal processing apparatus according to claim 1, wherein, when a plurality of distortion characteristics have been selected by said selection means, and a value of an nth (n is an integer) previous symbol relative to the specific symbol is identical in each of the combinations of the values of the symbols corresponding to the plurality of distortion characteristics, said determination means determines the value of the nth previous symbol in each of the combinations of the values of the symbols to be a value of an nth previous symbol in the signal transmitted over the transmission path.

5. The signal processing apparatus according to claim 1, wherein, when a plurality of distortion characteristics have been selected by said selection means, said determination means determines a value of the specific symbol that occurs most frequently in the combinations of the values of the symbols corresponding to the plurality of distortion characteristics to be the value of the specific symbol in the signal transmitted over the transmission path.

6. The signal processing apparatus according to claim 1, wherein, when a plurality of distortion characteristics have been selected by said selection means, said determination means determines a value of an nth previous symbol, relative to the specific symbol, that occurs most frequently in the combinations of the values of the symbols corresponding to the plurality of distortion characteristics to be a value of an nth previous symbol in the signal transmitted over the transmission path.

7. The signal processing apparatus according to claim 1, wherein the storage means stores the number of distortion characteristics equal to 128, the specific number of symbols transmitted before the specific symbol (y)+1=7, and the number of different possible symbols =2.

8. A signal processing method for processing a signal transmitted over a transmission path that causes stationary distortion to occur in a waveform representing a signal value of a specific symbol in accordance with a value of a symbol transmitted before the specific symbol, the method comprising:

acquiring the signal value of the specific symbol from the signal transmitted over the transmission path;

calculating a correlation coefficient between the waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols, a number of different distortion characteristics (d) is equal to the following equation:

$$d = x^{(y+1)}$$

where, x is equal to a number of different possible symbols;
and y is the specific number of symbols transmitted before the specific symbol;

based on the correlation coefficients calculated with respect to each combination of the values of the symbols, selecting one or more distortion characteristics having a high correlation with the waveform representing the signal value of the specific symbol; and based on the combination of the values of the symbols corresponding to each of the one or more distortion characteristics having a high correlation with the waveform representing the signal value of the specific symbol, determining the values of the symbols in the signal transmitted over the transmission path.

9. The signal processing method according to claim 8, wherein the number of distortion characteristics is equal to 128, the specific number of symbols transmitted before the specific symbol (y)+1=7, and the number of different possible symbols =2.

10. A non-transitory computer readable medium encoded with a program that causes a computer to perform signal processing of processing a signal transmitted over a transmission path that causes stationary distortion to occur in a waveform representing a signal value of a specific symbol in accordance with a value of a symbol transmitted before the specific symbol, the program causing the computer to perform a method comprising:

acquiring the signal value of the specific symbol from the signal transmitted over the transmission path;

calculating a correlation coefficient between the waveform representing the signal value of the specific symbol in the signal transmitted over the transmission path and each of distortion characteristics, each of which is a characteristic of a waveform that represents the signal value of the specific symbol and is distorted in accordance with the value of the specific symbol and a separate combination of values of a specific number of symbols transmitted before the specific symbol with respect to combination of the values of the symbols, a number of different distortion characteristics (d) is equal to the following equation:

$$d = x^{(y+1)}$$

where, x is equal to a number of different possible symbols; and y is the specific number of symbols transmitted before the specific symbol;

based on the correlation coefficients calculated with respect to each combination of the values of the symbols, selecting one or more distortion characteristics having a high correlation with the waveform representing the signal value of the specific symbol; and based on the combination of the values of the symbols corresponding to each of the one or more distortion characteristics having a high correlation with the waveform representing the signal value of the specific symbol, determining the values of the symbols in the signal transmitted over the transmission path.

11. The non-transitory computer readable medium according to claim 10, wherein the number of distortion characteristics is equal to 128, the specific number of symbols transmitted before the specific symbol (y)+1=7, and the number of different possible symbols =2.

12. A signal processing apparatus that processes a signal transmitted over a transmission path that causes stationary distortion to occur in a waveform representing a signal value of a specific symbol in accordance with a value of a symbol transmitted before the specific symbol, the apparatus comprising:

a storage section configured to store distortion characteristics, each of which is a characteristic of a waveform that represents the signal value of the specific symbol and is distorted in accordance with the value of the specific symbol and a separate combination of values of a specific number of symbols transmitted before the specific symbol, the storage section configured to store a number of different distortion characteristics (d) is equal to the following equation:

$$d = x^{(y+1)}$$

where, x is equal to a number of different possible symbols; and y is the specific number of symbols transmitted before the specific symbol;

an acquisition section configured to acquire the signal value of the specific symbol from the signal transmitted over the transmission path;

a correlation coefficient calculation section configured to calculate a correlation coefficient between the waveform representing the signal value of the specific symbol acquired by said acquisition section and each of the distortion characteristics stored in said storage section;

a selection section configured to select one or more distortion characteristics having a high correlation with the waveform representing the signal value of the specific symbol acquired by said acquisition section, based on the correlation coefficients calculated by said correlation coefficient calculation section; and a determination section configured to determine the values of the symbols in the signal transmitted over the transmission path based on the combination of the values of the symbols corresponding to each of the one or more distortion characteristics selected by said selection section.

13. The signal processing apparatus according to claim 12, wherein the storage section is configured to store the number of distortion characteristics equal to 128, the specific number of symbols transmitted before the specific symbol (y)+1=7, and the number of different possible symbols =2.

14. The signal processing apparatus according to claim 12, wherein the selection section is configured to select test patterns having a correlation coefficient greater than 0.8 as having a high correlation with the waveform.

* * * * *